United States Patent
Li et al.

(10) Patent No.: US 12,550,192 B2
(45) Date of Patent: Feb. 10, 2026

(54) CHANNEL CONTENTION METHOD AND RELATED APPARATUS

(71) Applicant: Huawei Technologies Co., Ltd., Shenzhen (CN)

(72) Inventors: Yiqing Li, Shenzhen (CN); Yunbo Li, Shenzhen (CN); Yuchen Guo, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 18/168,048

(22) Filed: Feb. 13, 2023

(65) Prior Publication Data
US 2023/0199850 A1    Jun. 22, 2023

Related U.S. Application Data

(63) Continuation of application No. PCT/CN2021/107596, filed on Jul. 21, 2021.

(30) Foreign Application Priority Data

Aug. 14, 2020    (CN) .......................... 202010820609.9

(51) Int. Cl.
H04W 74/08    (2024.01)
H04W 74/0816    (2024.01)

(52) U.S. Cl.
CPC .............................. H04W 74/0816 (2013.01)

(58) Field of Classification Search
CPC . H04W 74/0816; H04W 84/12; H04W 24/08; Y02D 30/70
See application file for complete search history.

(56) References Cited

U.S. PATENT DOCUMENTS

2012/0051338 A1    3/2012    Seok
2016/0043855 A1    2/2016    Seok
(Continued)

FOREIGN PATENT DOCUMENTS

CN    108353424 A    7/2018
CN    111147165 A    5/2020
(Continued)

OTHER PUBLICATIONS

IEEE Std 802.11a-1999,Part 11: Wireless LAN Medium Access Control (MAC) and Physical Layer (PHY) specifications: High-speed Physical Layer in the 5 GHZ Band,Sep. 16, 1999,total 90 pages.
(Continued)

*Primary Examiner* — Walli Z Butt
(74) *Attorney, Agent, or Firm* — Slater Matsil, LLP

(57) ABSTRACT

This application provides a channel contention method and a related apparatus. The method includes: After data transmission on a first link is completed or a block acknowledgment corresponding to data is received on the first link, a first non-access point station of a first multi-link device performs clear channel assessment CCA detection on a second link in a first time period, where a start moment corresponding to the first time period is the same as a moment at which the data transmission on the first link is completed; and when the CCA detection on the second link fails, the first non-access point station performs channel contention on the second link based on a second time period.

16 Claims, 14 Drawing Sheets

---

801: After data transmission on a first link is completed or a block ack corresponding to data is received on the first link, perform physical carrier sense CCA detection on a second link in a first time period

↓

802: When CCA detection on the second link fails, perform channel contention on the second link based on a second time period

(56) References Cited

U.S. PATENT DOCUMENTS

| | | | |
|---|---|---|---|
| 2018/0213563 A1 | 7/2018 | Yang et al. | |
| 2020/0146060 A1 | 5/2020 | Jung et al. | |
| 2020/0288523 A1* | 9/2020 | Patil | H04W 80/02 |
| 2021/0127420 A1* | 4/2021 | Lu | H04W 74/0808 |

FOREIGN PATENT DOCUMENTS

| | | |
|---|---|---|
| WO | 2018117723 A1 | 6/2018 |
| WO | 2019160485 A1 | 8/2019 |
| WO | 2020050680 A1 | 3/2020 |
| WO | 2020101807 A2 | 5/2020 |
| WO | 2021173588 A1 | 9/2021 |

OTHER PUBLICATIONS

Chi-Ming Wong et al,"An Additional Clear Channel Assessment for IEEE 802.15.4 Slotted CSMA/CA Networks", Jan. 13, 2011,total 5 pages.

Ming Gan et al,"AP assisted Non-STR behavior",IEEE802.11-20/0613-02-00be,Apr. 1, 2020,total 10 pages.

Yiqing Li et al,"Further Discussion about Blindness for non-STR MLD",IEEE 802.11-20/1365r0,Aug. 18, 2020,total 7 pages.

IEEE Std 802.11b-1999/Cor Jan. 2001,Part 11: Wireless LAN Medium Access Control (MAC) and Physical Layer (PHY) specifications Amendment 2: Higher-speed Physical Layer (PHY), extension in the 2.4 GHz band-Corrigendum 1,Nov. 7, 2001,total 24 pages.

IEEE Std 802.11g™-2003,Part 11: Wireless LAN Medium Access Control (MAC) and Physical Layer (PHY) specifications,Amendment 4: Further Higher Data Rate Extension in the 2.4 GHz Band,Jun. 27, 2003,total 78 pages.

IEEE Std 802.11n™-2009,Part 11: Wireless LAN Medium Access Control (MAC) and Physical Layer (PHY) specifications, Amendment 5:Enhancements for Higher Throughput,Oct. 29, 2009,total 536 pages.

IEEE Std 802.11ac™-2013,Part 11: Wireless LAN Medium Access Control (MAC) and Physical Layer (PHY) Specifications, Amendment 4: Enhancements for Very High Throughput for Operation in Bands below 6 GHz,Dec. 11, 2013,total 425 pages.

IEEE P802.11ax ™M/D6.0,Part 11: Wireless LAN Medium Access Control(MAC) and Physical Layer (PHY) Specifications,Amendment 1: Enhancements for High Efficiency WLAN,Nov. 2019,total 780 pages.

IEEE P802.11be™/D0.01,Part 11: Wireless LAN Medium Access Control (MAC) and Physical Layer (PHY) Specifications,Amendment 7: Enhancements for extremely high throughput (EHT),Jul. 2020,total 33 pages.

Dibakar Das et al,."Blindness issue for non-STR operations-followup" IEEE 802.11-20/1009r2,Jul. 3, 2020,total 12 pages.

Duncan Ho et al,."Non-STR STA Behaviors" IEEE 802.11-20/0444r1,Mar. 14, 2020,total 7 pages.

Dibakar Das et al,."Impact of channel blindness during ML",IEEE 802.11-20/0490r0,Mar. 2020,total 9 pages.

Matthew Fischer:"MLO Synchronous Transmission" IEEE 802.11-20/0081r2,Jan. 10, 2020,total 59 pages.

Matthew Fischer:"Synchronous Transmitter Medium State Information" IEEE 802.11-20/0082r2,Jan. 9, 2020,total 31 pages.

Sharan Naribole et al,"Multi-link Channel Access Discussion" IEEE 802.11-19/1405r1,Sep. 15, 2019,total 18 pages.

Ming Gan et al,"AP assisted Non-STR behavior" IEEE 802.11-20/0613r1,Apr. 1, 2020,total 10 pages.

Sharan Naribole et al,"Multi-link Channel Access Discussion" IEEE 802.11-19/1405r7 Oct. 31, 2019,total 18 pages.

Dibakar Das et al,"Blindness issue for non-STR operations-followup",IEEE 802.11-20/1009r1,Jul. 3, 2020,total 12 pages.

Dibakar Das, et al (INTEL): "Blindness issue for non-STR operations—followup", IEEE 802.11-20/1009r0, Jul. 3, 2020 (Jul. 3, 2020), pp. 1-12.

Insun Jang (LG Electronics): "Non-AP MLD Initiated Aggregation: Opportunity in TXOP", IEEE Draft; 802.11-20-0739-01-OOBE-Non-AP-MLDInitiated-Aggregation-Opportunity-in-TXOP, IEEE-SA Mentor, Piscataway, NJ USA, vol. 802.11 EHT; 802.1 lbe, No. 1, Jul. 13, 2020 (Jul. 13, 2020), pp. 1-17.

Ming Gan (Huawei): "AP assisted Non-STR behavior", IEEE Draft; 802.11-20/0613-01-OOBE-AP-Assisted-Non-STR-Behavior, IEEE-SA Mentor, Piscataway, NJ USA, vol. 802.11 EHT; 802.1 lbe, No. 1, Apr. 1, 2020 (Apr. 1, 2020), pp. 1-10.

* cited by examiner

AP MLD: access point multi-link device
non-AP MLD: non-access point multi-link device
non-AP STA: non-access point station AP MLD: access point multi-link device
non-AP MLD: non-access point multi-link device non-AP MLD: non-access point multi-link device
non-AP STA: non-access point station
MAC: medium access control layer
PHY: physical layer non-AP MLD: non-access point multi-link device
non-AP STA: non-access point station
MAC: medium access control layer
PHY: physical layer

CHANNEL CONTENTION METHOD AND RELATED APPARATUS

CROSS-REFERENCE TO RELATED APPLICATIONS

This application is a continuation of International Application No. PCT/CN2021/107596, filed on Jul. 21, 2021, which claims priority to Chinese Patent Application No. 202010820609.9, filed on Aug. 14, 2020. The disclosures of the aforementioned applications are hereby incorporated by reference in their entireties.

TECHNICAL FIELD

This application relates to the field of communication technologies, and in particular, to a channel contention method and a related apparatus.

BACKGROUND

Currently, a next-generation wireless local area network (WLAN) or a cellular network develops and evolves for a continuous technical goal of continuously increasing a throughput. Protocols of a WLAN system were mainly discussed by the Institute of Electrical and Electronics Engineers (IEEE) standard group. Based on the previous standard protocols IEEE 802.11a/b/g/n/ac/ax, the next-generation Wi-Fi standard IEEE 802.11be has a technical objective of extremely high throughput (EHT), and relates to a key technology, namely, multi-link communication. The core idea of multi-link communication is that a WLAN device that supports the next-generation IEEE 802.11 standard has a multi-band transmit and receive capability, and therefore uses a larger bandwidth for data transmission, to significantly increase a throughput. Multiple bands include but are not limited to the 2.4 GHz Wi-Fi band, the 5 GHz Wi-Fi band, and the 6 GHz Wi-Fi band. A frequency band in which a communication device performs access and transmission may be referred to as one link. A plurality of frequency bands in which the communication device performs access and transmission may be referred to as multi-link. A station device that supports the next-generation IEEE 802.11 standard on a plurality of links is referred to as a multi-link device (MLD). The multi-link device can support multi-link communication. For example, FIG. 1 is a schematic diagram of a multi-link communication scenario according to an embodiment of this application. As shown in FIG. 1, an access point (AP) multi-link device includes an AP 1 and an AP 2. A non-access point station (non-AP STA) MLD includes a non-AP STA 1 and a non-AP STA 2. The AP 1 communicates with the non-AP STA 1 on a link 1. The AP 2 communicates with the non-AP STA 2 on a link 2. It may be understood that communication between the AP MLD and the STA MLD is multi-link communication.

However, some multi-link devices may not support simultaneous transmit and receive (STR) on a plurality of links in some cases. If a frequency spacing between a plurality of frequency bands supported by a non-STR (non-simultaneous transmit and receive) multi-link device (herein refers to a multi-link device that does not support STR) is small, when data is transmitted on one link, channel interference may affect clear channel assessment (CCA) on another link. As a result, it may be determined that the another link is in a blindness period (blindness period, or deaf period). The blindness period means that information on a channel cannot be monitored. In this case, in an existing solution, it is proposed in the standard 802.11-20/1009r1 that after data transmission is completed, the non-STR MLD may set a medium sync delay timer for the another link, and perform CCA on the another link in the timer based on a to be decided (TBD) energy detection (ED) threshold. If CCA detection fails on one link of the another link, it means that an overlapping basic service set (OBSS) frame is being transmitted on the link. After transmission of the OBSS frame ends, the non-STR MLD starts to contend for a channel, and starts enhanced distributed channel access (EDCA).

However, after transmission of the OBSS frame ends, a transmission opportunity (TXOP) corresponding to the link may not end. As a result, after accessing the channel, the non-STR MLD collides with an ack (ACK) frame corresponding to the OBSS frame. Therefore, how to avoid inter-frame collision and interference during EDCA becomes a technical problem that urgently needs to be resolved currently.

SUMMARY

This application provides a channel contention method and a related apparatus, to support a non-simultaneous transmit and receive multi-link device to reduce inter-frame collision and interference during channel contention. This improves communication efficiency.

According to a first aspect, an embodiment of this application provides a channel contention method. The method includes: after data transmission on a first link is completed or after a block ack corresponding to data is received on the first link, a first non-access point station of a first multi-link device performs clear channel assessment CCA detection on a second link in a first time period, where a start moment corresponding to the first time period is the same as a moment at which the data transmission on the first link is completed; and when the CCA detection on the second link fails, the first non-access point station performs channel contention on the second link based on a second time period.

It may be understood that, in this solution, after data transmission on the first link is completed or after the block ack corresponding to the data is received on the first link, when CCA detection is performed on the second link and the CCA detection on the second link fails, channel contention is performed on the second link based on the second time period, to avoid inter-frame collision and interference caused by channel contention on the second link after it is determined that data transmission on the second link is completed. This reduces inter-frame collision and interference, and improves communication efficiency.

Optionally, the performing clear channel assessment CCA detection on a second link in a first time period includes: the first non-access point station adjusts a CCA threshold to obtain an adjusted CCA threshold, where the adjusted CCA threshold is less than the CCA threshold; and the first non-access point station performs CCA detection on the second link in the first time period based on the adjusted CCA threshold.

It may be understood that, in this solution, when CCA detection is performed on the second link, a stricter CCA threshold may be used to perform CCA detection on the second link, to avoid subsequent inter-frame collision and interference caused when channel contention is performed on the second link after it is determined that data transmission on the second link is completed.

Optionally, the CCA threshold includes an energy detection threshold or a midamble-energy detection threshold.

Optionally, the performing channel contention on the second link based on a second time period includes: if an end moment corresponding to the second time period is earlier than an end moment corresponding to the first time period, the first non-access point station performs channel contention on the second link after the end moment corresponding to the second time period; or if an end moment corresponding to the second time period is later than an end moment corresponding to the first time period, the first non-access point station performs channel contention on the second link after the end moment corresponding to the first time period or after the end moment corresponding to the second time period.

It may be understood that, in this solution, channel contention is performed on the second link in different cases after the end moment corresponding to the first time period or after the end moment corresponding to the second time period, to avoid inter-frame collision and interference caused when channel contention is performed on the second link after it is determined that data transmission on the second link is completed. This reduces inter-frame collision and interference, and improves communication efficiency.

Optionally, the method further includes: the first non-access point station updates a network allocation vector NAV based on a radio frame to obtain an updated NAV, where the radio frame is a radio frame sent to a second non-access point station on the second link when the data is being transmitted on the first link or when the block ack corresponding to the data is being transmitted on the first link, and the second non-access point station is a non-access point station other than the first non-access point station in the first multi-link device; and the first non-access point station performs channel contention on the second link based on the updated NAV.

It may be understood that, in this solution, channel contention is performed on the second link based on the updated NAV, to avoid inter-frame collision and interference caused when channel contention is performed on the second link after it is determined that data transmission on the second link is completed. This reduces inter-frame collision and interference, and improves communication efficiency.

Optionally, the performing channel contention on the second link based on the updated NAV includes: if the updated NAV is less than a moment at which the data transmission on the first link is completed or a moment at which the block ack is received on the first link, the first non-access point station performs CCA detection on the second link in the first time period; and when the CCA detection on the second link fails, the first non-access point station performs channel contention on the second link based on the second time period; or if the updated NAV is greater than a moment at which the data transmission on the first link is completed or a moment at which the block ack is received on the first link, the first non-access point station performs channel contention on the second link when the updated NAV backs off to zero.

It may be understood that, in this solution, channel contention is performed on the second link in different cases, to avoid inter-frame collision and interference caused when channel contention is performed on the second link after it is determined that data transmission on the second link is completed. This reduces inter-frame collision and interference, and improves communication efficiency.

Optionally, the second time period is extended inter-frame space EIFS time.

According to a second aspect, an embodiment of this application provides a communication apparatus applied to a first multi-link device. The communication apparatus may be the first multi-link device, or a chip in the first multi-link device, for example, a Wi-Fi chip. The communication apparatus includes: a processing unit, configured to: after data transmission on a first link is completed or after a block ack corresponding to data is received on the first link, perform, by a first non-access point station of the first multi-link device, clear channel assessment CCA detection on a second link in a first time period, where a start moment corresponding to the first time period is the same as a moment at which the data transmission on the first link is completed; and the processing unit is further configured to: when the CCA detection on the second link fails, perform, by the first non-access point station, channel contention on the second link based on a second time period.

Optionally, when the clear channel assessment CCA detection is performed on the second link in the first time period, the processing unit is configured to: adjust a CCA threshold to obtain an adjusted CCA threshold, where the adjusted CCA threshold is less than the CCA threshold; and perform CCA detection on the second link in the first time period based on the adjusted CCA threshold.

Optionally, the CCA threshold includes an energy detection threshold or a midamble-energy detection threshold.

Optionally, when channel contention is performed on the second link based on the second time period, if an end moment corresponding to the second time period is earlier than an end moment corresponding to the first time period, the processing unit is configured to perform channel contention on the second link after the end moment corresponding to the second time period; or if an end moment corresponding to the second time period is later than an end moment corresponding to the first time period, the processing unit is configured to perform channel contention on the second link after the end moment corresponding to the first time period or after the end moment corresponding to the second time period.

Optionally, the processing unit is further configured to: update a network allocation vector NAV based on a radio frame to obtain an updated NAV, where the radio frame is a radio frame sent to a second non-access point station on the second link when the data is being transmitted on the first link or when the block ack corresponding to the data is being transmitted on the first link, and the second non-access point station is a non-access point station other than the first non-access point station in the first multi-link device; and performing channel contention on the second link based on the updated NAV.

Optionally, when channel contention is performed on the second link based on the updated NAV, if the updated NAV is less than a moment at which the data transmission on the first link is completed or a moment at which the block ack is received on the first link, the processing unit is configured to: perform CCA detection on the second link in the first time period; and when the CCA detection on the second link fails, perform, by the first non-access point station, channel contention on the second link based on the second time period; or if the updated NAV is greater than a moment at which the data transmission on the first link is completed or a moment at which the block ack is received on the first link, the processing unit is configured to perform channel contention on the second link when the updated NAV backs off to zero.

Optionally, the second time period is extended inter-frame space EIFS time.

According to a third aspect, an embodiment of this application provides a communication apparatus, which is specifically a first multi-link device. The first multi-link device has a function of implementing behavior of the first multi-link device in the foregoing method. The function may be implemented by hardware, or may be implemented by hardware executing responding software. The hardware or the software includes one or more modules corresponding to the foregoing function.

In a possible design, the first multi-link device includes a processor and a transceiver. The processor is configured to support the first multi-link device in performing a corresponding function in the foregoing method. The transceiver is configured to: support communication of the first multi-link device, and receive information, a frame, a data packet, or instructions in the foregoing method. The first multi-link device may further include a memory. The memory is coupled to the processor, and the memory stores program instructions and data that are necessary for the first multi-link device.

According to a fourth aspect, an embodiment of this application provides a wireless communication system. The system includes the first multi-link device in the third aspect.

According to a fifth aspect, an embodiment of this application provides a chip or a chip system, including an input/output interface and a processing circuit. The input/output interface is used for information or data exchange. The processing circuit is configured to run instructions, so that an apparatus in which the chip or the chip system is installed performs the channel contention method in any one of the foregoing aspects.

According to a sixth aspect, an embodiment of this application provides a computer-readable storage medium. The computer-readable storage medium stores instructions. The instructions may be executed by one or more processors on a processing circuit. When the instructions are run on a computer, the computer is enabled to perform the channel contention method in any one of the foregoing aspects.

According to a seventh aspect, this application provides a computer program product including instructions. When the instructions are run on a computer, the computer is enabled to perform the channel contention method in any one of the foregoing aspects.

According to an eighth aspect, this application provides a chip system. The chip system includes a processor, configured to support an apparatus in which the chip system is installed in implementing the channel contention method in any one of the foregoing aspects, for example, processing a frame and/or information in the foregoing channel contention method. In a possible design, the chip system further includes a memory. The memory is configured to store program instructions and data that are necessary for a data sending device. The chip system may include a chip, or may include a chip and another discrete component.

BRIEF DESCRIPTION OF THE DRAWINGS

The following briefly describes the accompanying drawings used in embodiments or a conventional technology.

DETAILED DESCRIPTION OF ILLUSTRATIVE EMBODIMENTS

Figure 1:
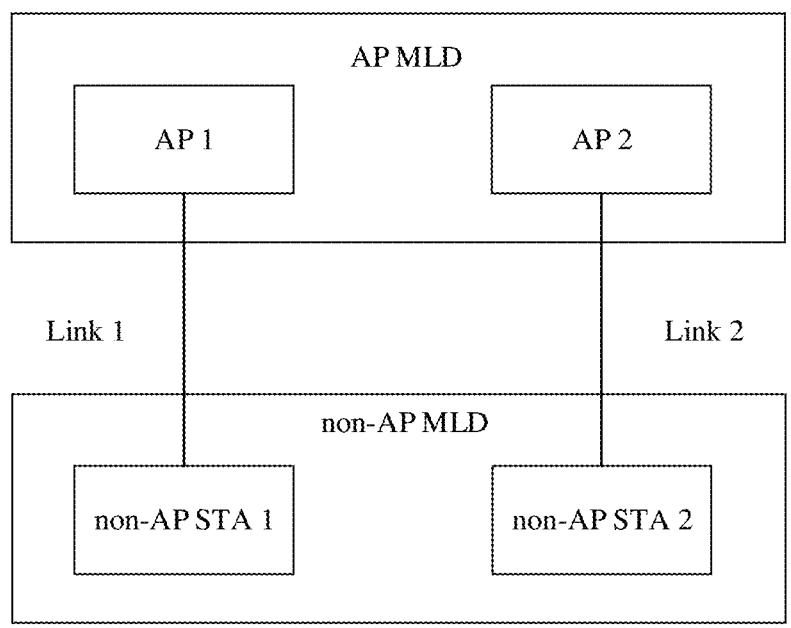
FIG. 1 is a schematic diagram of a multi-link communication scenario according to an embodiment of this application.

The following describes the technical solutions in embodiments of this application with reference to the accompanying drawings in embodiments of this application.

To facilitate understanding of the technical solutions in embodiments of this application, the following briefly describes meanings of some nouns (or terms) in embodiments of this application.

1. Transmission Opportunity (TXOP)

TXOP duration is a period of time in which a station (the station herein may refer to an access point or a non-access point station) performs data transmission without interference after obtaining a transmission opportunity. The station that obtains the TXOP may be referred to as a TXOP holder. The TXOP duration includes duration required by the TXOP holder to transmit one or more pieces of data and a corresponding immediate response frame (the immediate response frame herein may refer to an ack frame, a block ack, or the like). According to laws and regulations of countries and regions, the TXOP duration may not exceed an upper limit. The upper limit is referred to as a TXOP limit. The value of the TXOP limit is subject to the laws and regulations of the countries and/or regions.

Optionally, an AP may broadcast the value of the TXOP limit by using a beacon frame or a probe response frame.

Optionally, the TXOP limit is further related to an access category (AC, or referred to as an access type) for which a transmission opportunity is obtained through contention. Specifically, Table 1 describes values of TXOP limits corresponding to four different access categories. Herein, AC_VO indicates that an access category is a voice stream, AC_VI indicates that an access category is a video stream, AC_BE indicates that an access category is a best effort stream, and AC_BK indicates that an access category is a background stream.

TABLE 1

TXOP limits corresponding to different access categories

| AC | AC_BK | AC_BE | AC_VI | AC_VO |
|---|---|---|---|---|
| TXOP limit | 2.528 ms | 2.528 ms | 4.096 ms | 2.080 ms |

Optionally, a priority of the voice stream, a priority of the video stream, a priority of the best effort stream, and a priority of the background stream decrease in sequence. In other words, the priorities are ranked from high to low: AC_VO, AC_VI, AC_BE, and AC_BK. It may be understood that a higher priority indicates a higher channel preemption capability.

It may be understood that "data transmission" and "transmission data" mentioned in embodiments of this application generally refer to communication. "Data" generally refers to communication information, is not limited to data information, and may also be signaling information or the like.

2. Network Allocation Vector (NAV)

Virtual carrier sense is a type of carrier sense. Channel conditions are learned through control information instead of actually detecting physical channels. Specifically, virtual carrier sense implements logical prediction based on related information carried in a media access control (MAC) frame. In other words, each frame carries duration information of a next frame of a transmit station, and each station related to the transmit station predicts channel occupancy based on the duration information. If a station does not monitor the duration information, for example, when a carrier is sensed, a duration field of the frame has been transmitted, the station may only rely on physical layer detection.

Virtual carrier sense may be implemented by using a network allocation vector NAV. The NAV is essentially a countdown timer, and gradually decreases with the passing of time. When the NAV is counted down to 0, a medium is considered to be idle. Therefore, a timing value of the NAV is set and updated through the virtual carrier sense with an appropriate value at an appropriate time. Specifically, after a station receives a frame, if a receiver address of the frame is not the station, the station may update an NAV based on a duration field in the received frame. If the receiver address of the frame is the station, it indicates that the station is a receive station and may not update the NAV.

Optionally, before the NAV is updated, it may be further determined whether a value of the duration field in the current frame is greater than a current NAV value of the station. If the value is greater than the current NAV value, the NAV is updated. On the contrary, if the value is less than or equal to the current NAV value, the NAV is not updated. The NAV value starts from an end moment of the received frame.

It may be understood that the duration field may be used to notify another non-receive station of duration in which the channel is occupied, to prevent the another non-receive station from accessing the channel and transmitting data.

Optionally, after obtaining a TXOP, the transmit station may set a value of a duration field, so that the TXOP duration does not exceed the TXOP limit.

Figure 2A:
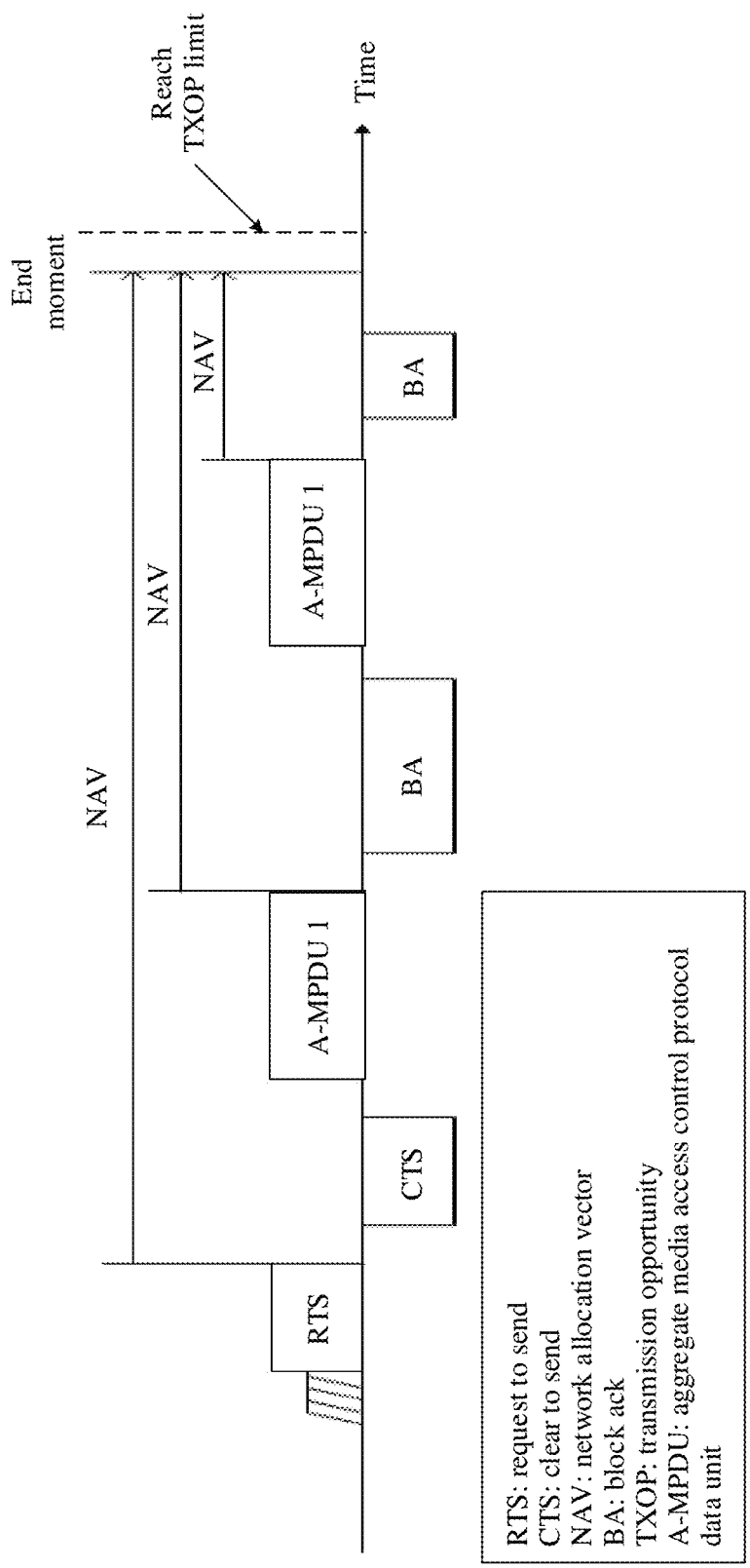
FIG. 2A is a schematic diagram of setting an NAV according to an embodiment of this application.

FIG. 2A is a schematic diagram of setting an NAV according to an embodiment of this application. As shown in FIG. 2A, after obtaining a TXOP, a transmit station sets a value of a duration field in a first sent frame (for example, a request to send (RTS) frame in FIG. 2A), so that a TXOP duration does not exceed a TXOP limit. Then, a value of a duration field is set in a subsequent frame, so that an end moment corresponding to the duration field in the subsequent frame is the same as an end moment corresponding to the duration field in the previous frame. It should be noted that the RTS frame includes the duration field, an aggregate medium access control protocol data unit (A-MPDU) 1 includes a duration field, and an A-MPDU 2 also includes a duration field. For the RTS frame, a numeric value of the duration field of the RTS frame is greater than a numeric value of the duration field of the A-MPDU 1, and the numeric value of the duration field of the A-MPDU 1 is greater than a numeric value of the duration field of the A-MPDU 2. However, as shown in FIG. 2A, it may be learned that an NAV corresponding to the RTS frame, an NAV corresponding to the A-MPDU 1, and an NAV corresponding to the A-MPDU 2 have a same end moment. In other words, after the non-receive station separately updates the NAVs based on the duration field included in the RTS frame, the duration field included in the A-MPDU 1, and the duration field included in the A-MPDU 2, the NAV corresponding to the RTS frame, the NAV corresponding to the A-MPDU 1, and the NAV corresponding to the A-MPDU 2 have the same end moment. It may be understood that, in FIG. 2A, the value of the duration field carried in the RTS frame may be the same as the TXOP duration.

Figure 2B:
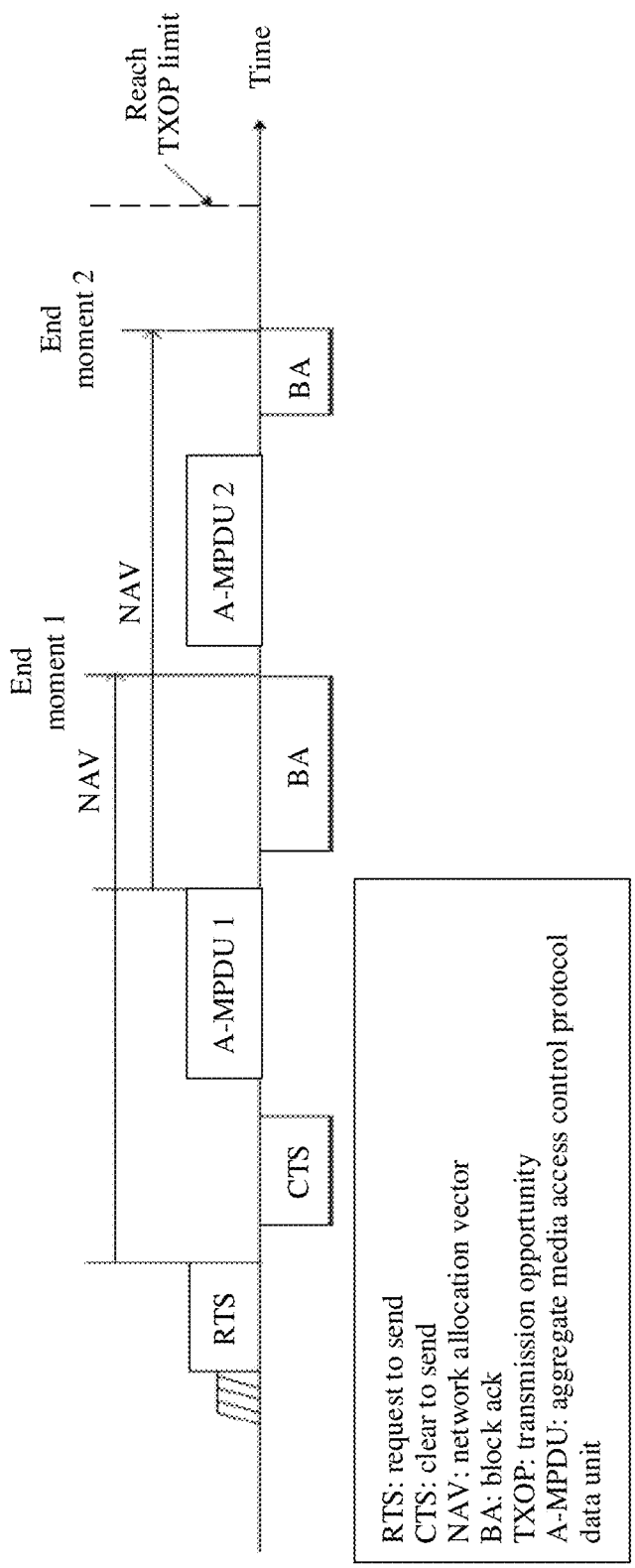
FIG. 2B is another schematic diagram of setting an NAV according to an embodiment of this application.

FIG. 2B is another schematic diagram of setting an NAV according to an embodiment of this application. As shown in FIG. 2B, after a transmit station obtains a TXOP, if a value of a duration field set in a first sent frame (for example, an RTS frame in FIG. 2B) is less than a TXOP limit, or a TXOP duration set for the first time is less than the TXOP limit, the value of the duration field may be set in a subsequent frame, so that a current TXOP duration exceeds an end moment of a previous TXOP duration. However, starting from the TXOP duration set for the first time, a total TXOP duration cannot exceed the TXOP limit. It should be noted that the RTS frame includes the duration field, and an A-MPDU 1 includes a duration field. As shown in FIG. 2B, it may be learned that an end moment 1 of an NAV corresponding to the RTS frame is earlier than an end moment 2 of an NAV corresponding to the A-MPDU 1. In other words, after a non-receive station separately updates the NAVs based on the duration field included in the RTS frame and the duration field included in the A-MPDU 1, the end moment 1 of the NAV corresponding to the RTS frame is earlier than the end moment 2 of the NAV corresponding to the A-MPDU 1. In addition, both the end moment 1 of the NAV corresponding to the RTS frame and the end moment 2 of the NAV corresponding to the A-MPDU 1 are earlier than the TXOP limit. This indicates that the end moment of the NAV corresponding to the frame sent after a sending moment of the RTS frame is also earlier than the TXOP limit. In other words, starting from the TXOP duration set for the first time, a total TXOP duration cannot exceed the TXOP limit. It may be understood that the non-receive station updates the NAV based on each received frame.

The foregoing content briefly describes meanings of some nouns (or terms) in embodiments of this application. To better understand a channel contention method provided in embodiments of this application, the following describes a system architecture and/or an application scenario of the channel contention method provided in embodiments of this application. It may be understood that scenarios described in embodiments of this application are intended to describe the technical solutions in embodiments of this application more clearly, and do not constitute a limitation on the technical solutions provided in embodiments of this application.

The technical solutions in embodiments of this application may be applied to a wireless communication system. The wireless communication system may be a wireless local area network (WLAN) or a cellular network. The method in embodiments of this application may be implemented by a communication device in the wireless communication system or a chip or a processor in the communication device. The communication device may be a wireless communication device that does not support STR. For example, the communication device may be referred to as a multi-link device or a multi-band device. Compared with a communication device that supports only single-link transmission, the multi-link device has higher transmission efficiency and a higher throughput.

The multi-link device includes one or more affiliated stations (affiliated STA). The affiliated stations are a logical station and may operate on one link. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device (AP MLD). A multi-link device whose affiliated station is a non-AP STA may be referred to as a multi-link STA, a multi-link STA device, or a STA multi-link device (STA MLD). For ease of description, "the multi-link device includes an affiliated station" is also briefly described as "the multi-link device includes a station" in embodiments of this application.

Optionally, the multi-link device includes a plurality of logical stations. Each logical station operates on one link, but the plurality of logical stations are allowed to operate on a same link. A link identifier mentioned below represents one station operating on one link. In other words, if there is more than one station on one link, more than one link identifier is required to represent the more than one station. A link mentioned below sometimes also represents a station operating on the link.

During data transmission, the AP multi-link device and the STA multi-link device may use a link identifier to identify one link or a station on one link. Before communication, the AP multi-link device and the STA multi-link device may negotiate or communicate with each other about a correspondence between a link identifier and one link or a station on one link. Therefore, during data transmission, the link identifier is carried without transmitting a large amount of signaling information to indicate the link or the station on the link. This reduces signaling overheads and improves transmission efficiency.

In an example, when the AP multi-link device establishes a basic service set (BSS), a sent management frame (for example, a beacon frame) carries an element including a plurality of link identifier information fields. Each link identifier information field may indicate a correspondence between a link identifier and a station operating on a link. Each link identifier information field includes a link identifier, and further includes one or more of a MAC address, an operation set, and a channel number, where the one or more of the MAC address, the operation set, and the channel number may indicate a link. In another example, in a multi-link association process, the AP multi-link device and the STA multi-link device negotiate a plurality of link identifier information fields. In subsequent communication, the AP multi-link device or the STA multi-link device identifies or represents a station in the multi-link device by using a link identifier. The link identifier may further represent one or more attributes of a MAC address, an operation set, and a channel number of the station. The MAC address may alternatively be an association identifier (AID) of the associated AP multi-link device.

If a plurality of stations operate on one link, the link identifier (which is a numeric ID) includes an operation set and a channel number of the link, and further includes an identifier of a station operating on the link, for example, a MAC address or an association identifier AID of the station.

The multi-link device may implement wireless communication in compliance with the IEEE 802.11 series protocols. For example, the multi-link device may be a station in compliance with the extremely high throughput, or may be a station based on the IEEE 802.11be or compatible with the IEEE 802.11be, to implement communication with another device.

The channel contention method provided in embodiments of this application may be applied to a scenario in which one node performs data transmission with one or more nodes, or may be applied to a single-user uplink/downlink data transmission scenario or a multi-user uplink/downlink data transmission scenario, or may be applied to a device-to-device (D2D) data transmission scenario.

Any one of the foregoing nodes may be an AP multi-link device, or may be a multi-link non-AP device. For example, the scenario may be a scenario in which an AP multi-link device performs data transmission with one or more non-AP multi-link devices; or a scenario in which a non-AP multi-link device performs data transmission with one or more AP multi-link devices; or a scenario in which a non-AP multi-link device performs data transmission with a non-AP multi-link device; or a scenario in which an AP multi-link device performs data transmission with an AP multi-link device. This is not limited in this embodiment of this application. In addition, the channel contention method provided in embodiments of this application may be further applied to a legacy station that supports transmission only on a single link. This is not limited herein.

Figure 3:
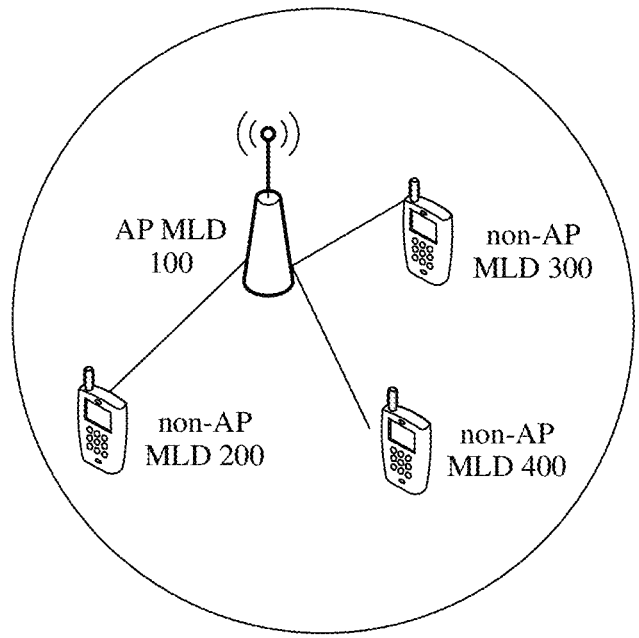
FIG. 3 is a schematic diagram of an architecture of a wireless communication system according to an embodiment of this application.

FIG. 3 is a schematic diagram of an architecture of a wireless communication system according to an embodiment of this application. FIG. 3 uses a wireless local area network as an example. The wireless communication system includes one AP multi-link device 100 and one or more non-AP multi-link devices (for example, a non-AP multi-link device 200, a non-AP multi-link device 300, and a non-AP multi-link device 400 in FIG. 3). The AP multi-link device is a multi-link device that provides a service for the non-AP multi-link device, and the non-AP multi-link device may communicate with the AP multi-link device on a plurality of links, to increase a throughput. A quantity of AP multi-link devices and a quantity of non-AP multi-link devices in FIG. 3 are merely an example.

For example, a multi-link device (for example, any multi-link device in the AP multi-link device 100, the non-AP multi-link device 200, the non-AP multi-link device 300, or the non-AP multi-link device 400 in FIG. 3) is an apparatus having a wireless communication function. The apparatus may be an entire device, or may be a chip, a processing system, or the like installed in the entire device. The device in which the chip or the processing system is installed may implement the method and function in embodiments of this application under control of the chip or the processing system. For example, the non-AP multi-link device in embodiments of this application has a wireless transceiver function, may support the 802.11 series protocols, and may communicate with the AP multi-link device or another non-AP multi-link device. For example, the non-AP multi-link device is any user communication device that allows a user to communicate with an AP and then communicate with a WLAN. For example, the non-AP multi-link device may be user equipment that can be connected to a network, such as a tablet computer, a desktop computer, a laptop computer, a notebook computer, an ultra-mobile personal computer (UMPC), a handheld computer, a netbook, a personal digital assistant (PDA), or a mobile phone, may be an internet of things node in the internet of things, or may be a vehicle-mounted communication apparatus in the internet of vehicles. The non-AP multi-link device may alternatively be a chip and a processing system in the foregoing terminals. The AP multi-link device in embodiments of this application is an apparatus that serves the non-AP multi-link device, and may support the 802.11 series protocols. For example, the AP multi-link device may be a communication entity such as a communication server, a router, a switch, or a bridge, or the AP multi-link device may include various forms of macro base stations, micro base stations, relay stations, and the like. Certainly, the AP multi-link device may alternatively be chips and processing systems in the various forms of devices, to implement the method and function in embodiments of this application.

It may be understood that the multi-link device may support high-rate and low-latency transmission. With continuous evolution of application scenarios of a wireless local area network, the multi-link device may be further applied to more scenarios, for example, a sensor node (for example, a smart meter, a smart electricity meter, and a smart air detection node) in a smart city, a smart device (for example, a smart camera, a projector, a display, a TV, a stereo, a refrigerator, and a washing machine) in smart home, a node in the internet of things, an entertainment terminal (for example, a wearable device such as an AR and a VR), a smart device (such as a printer and a projector) in a smart office, an internet of things device in the internet of vehicles, and some infrastructures (for example, a vending machine, a self-service navigation station of a supermarket, a self-service cash register device, and a self-service ordering machine) in daily life scenarios. Specific forms of the non-AP multi-link device and the AP multi-link device are not limited in embodiments of this application, and are merely described as examples herein. The 802.11 protocol may be a protocol that supports 802.11be or is compatible with 802.11be.

Figure 4:
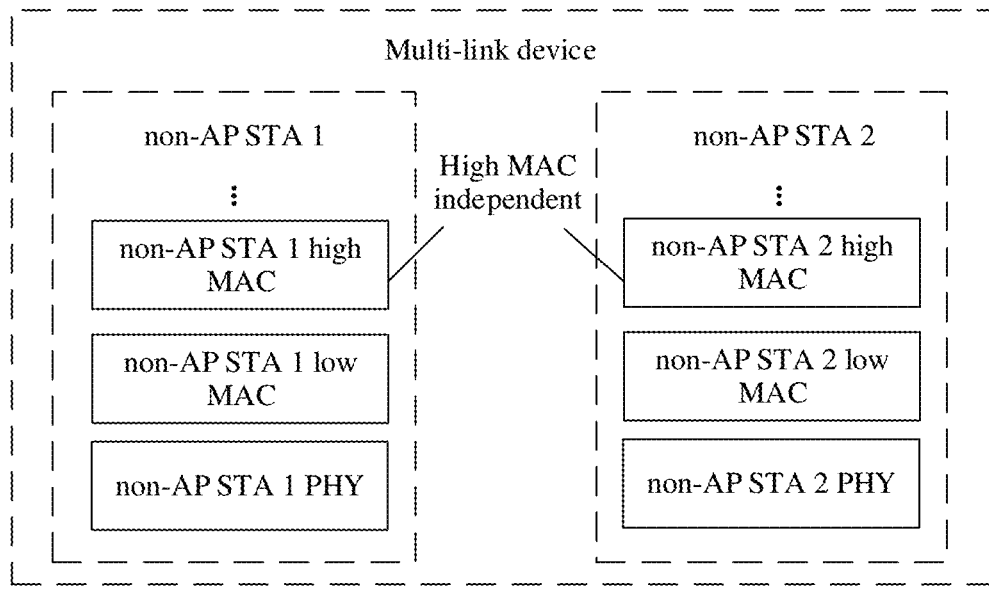
FIG. 4 is a schematic diagram of a structure of a multi-link device according to an embodiment of this application.
Figure 5:
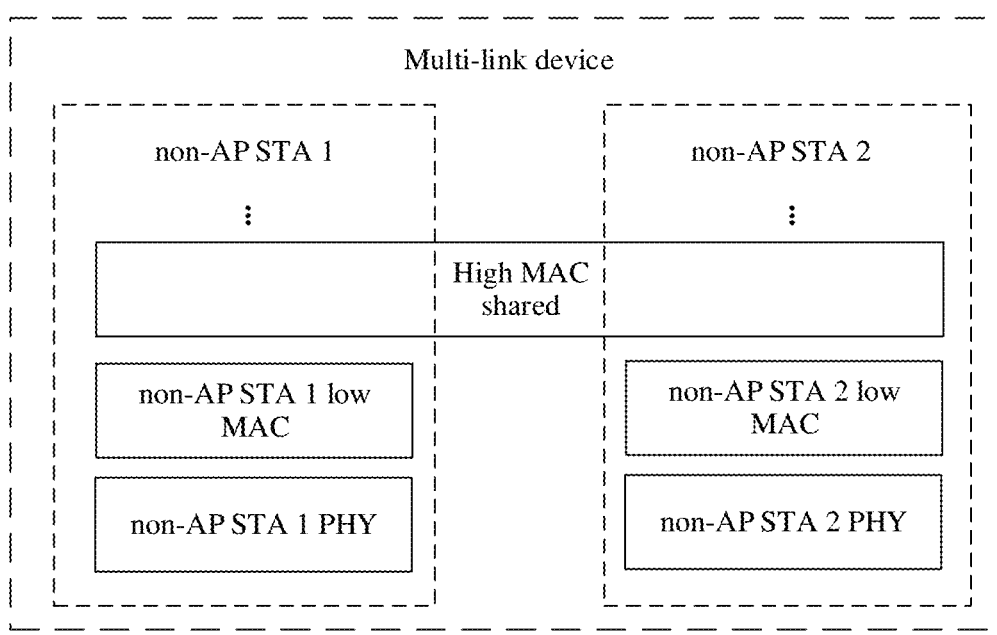
FIG. 5 is a schematic diagram of another structure of a multi-link device according to an embodiment of this application.

Optionally, FIG. 4 is a schematic diagram of a structure of a multi-link device according to an embodiment of this application. The IEEE 802.11 standard focuses on an 802.11 physical layer (PHY) part and a media access control (MAC) layer part in a multi-link device. As shown in FIG. 4, a plurality of non-AP STAs included in the multi-link device are independent of each other at a low MAC layer and a PHY layer, and are also independent of each other at a high MAC layer. FIG. 5 is a schematic diagram of another structure of a multi-link device according to an embodiment of this application. As shown in FIG. 5, a plurality of non-AP STAs included in the multi-link device are independent of each other at a low MAC layer and a PHY layer, and share a high MAC layer. Certainly, in a multi-link communication process, a non-AP multi-link device may use a structure in which high MAC layers are independent of each other, and an AP multi-link device uses a structure in which high MAC layers are shared. Alternatively, a non-AP multi-link device may use a structure in which high MAC layers are shared, and an AP multi-link device use a structure in which high MAC layers are independent of each other. Alternatively, both a non-AP multi-link device and an AP multi-link device may use a structure in which high MAC layers are shared. Alternatively, a non-AP multi-link device and an AP multi-link device may both use a structure in which high MAC layers are independent of each other. A schematic diagram of an internal structure of the multi-link device is not limited in this embodiment of this application. FIG. 4 and FIG. 5 are merely examples for description. For example, the high MAC layer or the low MAC layer may be implemented by one processor in a chip system of the multi-link device, or may be implemented by different processing modules in a chip system.

For example, the multi-link device in this embodiment of this application may be a single-antenna device, or may be a multi-antenna device. For example, the multi-link device may be a device with more than two antennas. The quantity of antennas included in the multi-link device is not limited in this embodiment of this application. In embodiments of this application, the multi-link device may allow services of a same access category to be transmitted on different links, or even allow same data packets to be transmitted on different links. Alternatively, the multi-link device may not allow services of a same access category to be transmitted on different links, but may allow services of different access categories to be transmitted on different links.

A frequency band in which the multi-link device operates may include one or more frequency bands of sub 1 GHz, 2.4 GHz, 5 GHz, 6 GHz, and high frequency 60 GHz.

Figure 6:
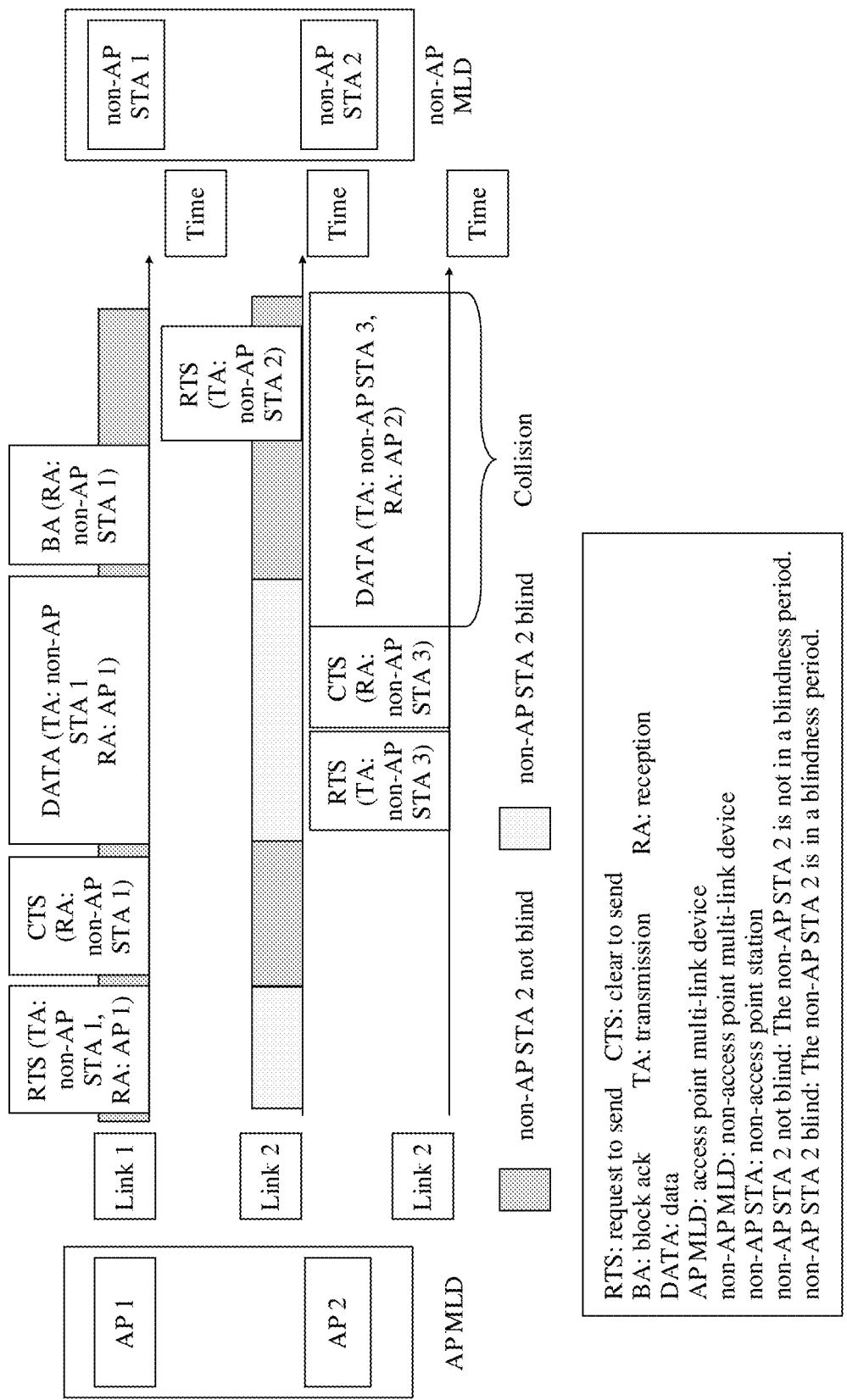
FIG. 6 is a schematic diagram of a contention channel according to an embodiment of this application.

Optionally, FIG. 6 is a schematic diagram of a contention channel according to an embodiment of this application. As shown in FIG. 6, it may be seen that an AP MLD includes an AP 1 and an AP 2. The AP MLD does not include an AP 3. The AP 3 may be a single device, or may be affiliated with another AP MLD. The AP 1 operates on a link 1, and the AP 2 operates on a link 2. A non-AP MLD includes a non-AP STA 1 and a non-AP STA 2. The non-AP MLD does not include a non-AP STA 3. The non-AP STA 3 may be a single device, or may be affiliated with another non-AP MLD. The non-AP STA 1 operates on a link 1, and the non-AP STA 2 and the non-AP STA 3 operate on a link 2. The non-AP STA 1 sends a request to send (RTS) frame to the AP 1 on the link 1. After receiving the request to send frame on the link 1, the AP 1 may reply with a clear to send (CTS) frame to the non-AP STA 1 on the link 1. After receiving the clear to send frame on the link 1, the non-AP STA 1 may send a data frame to the AP 1 on the link 1. After receiving the data frame on the link 1, the AP 1 may send a block ack to the non-AP STA 1 on the link 1.

It should be noted that, because a frequency spacing between frequency bands of the link 1 and the link 2 is small, when data is transmitted on the link 1, channel interference may affect CCA on the link 2. In this case, channel information of the link 2 may not be received. In other words, the link 2 is in a blindness period (or deaf period). The blindness period means that information on a channel cannot be monitored. Further, when data is transmitted on the link 1, even if the non-AP STA 2 sends a request to send frame on the link 2, the request to send frame may not be received due to channel interference. As a result, the non-AP STA 2 may miss an update of a network allocation vector (NAV).

In addition, as shown in FIG. 6, it may be learned that after data transmission on the link 1 is completed, the non-AP STA 3 starts to contend for a channel. Further, the non-AP STA 3 sends a request to send frame on the link 2, and the non-AP STA 3 also receives a clear to send frame on the link 2. Then, the non-AP STA 3 may send a data frame to the AP 2 on the link 2. At this time, the request to send frame is being transmitted on the link 2. In other words, the data frame sent by the non-AP STA 3 to the AP 2 on the link 2 collides with the request to send frame on the link 2. Therefore, a collision problem in this case is a blind problem.

To resolve the foregoing problem, it is proposed in the standard 802.11-20/1009r1 that after data transmission is completed, a non-STR MLD may set a medium sync delay timer for another link, and perform CCA on the another link in the timer based on a to be decided (TBD) energy detection (ED) threshold. If CCA detection fails on one link of the another link, it means that an overlapping basic service set (OBSS) frame is being transmitted on the link. After transmission of the OBSS frame ends, the non-STR MLD starts to contend for a channel, and starts enhanced distributed channel access (EDCA). In other words, after transmission of the OBSS frame ends, a request to send frame is sent on the link. However, a transmission opportunity (TXOP) corresponding to the OBSS frame on the link may not end. In other words, a block ack corresponding to the OBSS frame is being transmitted on the link. Therefore, the block ack corresponding to the OBSS frame on the link collides with the request to send frame on the link.

Figure 7:
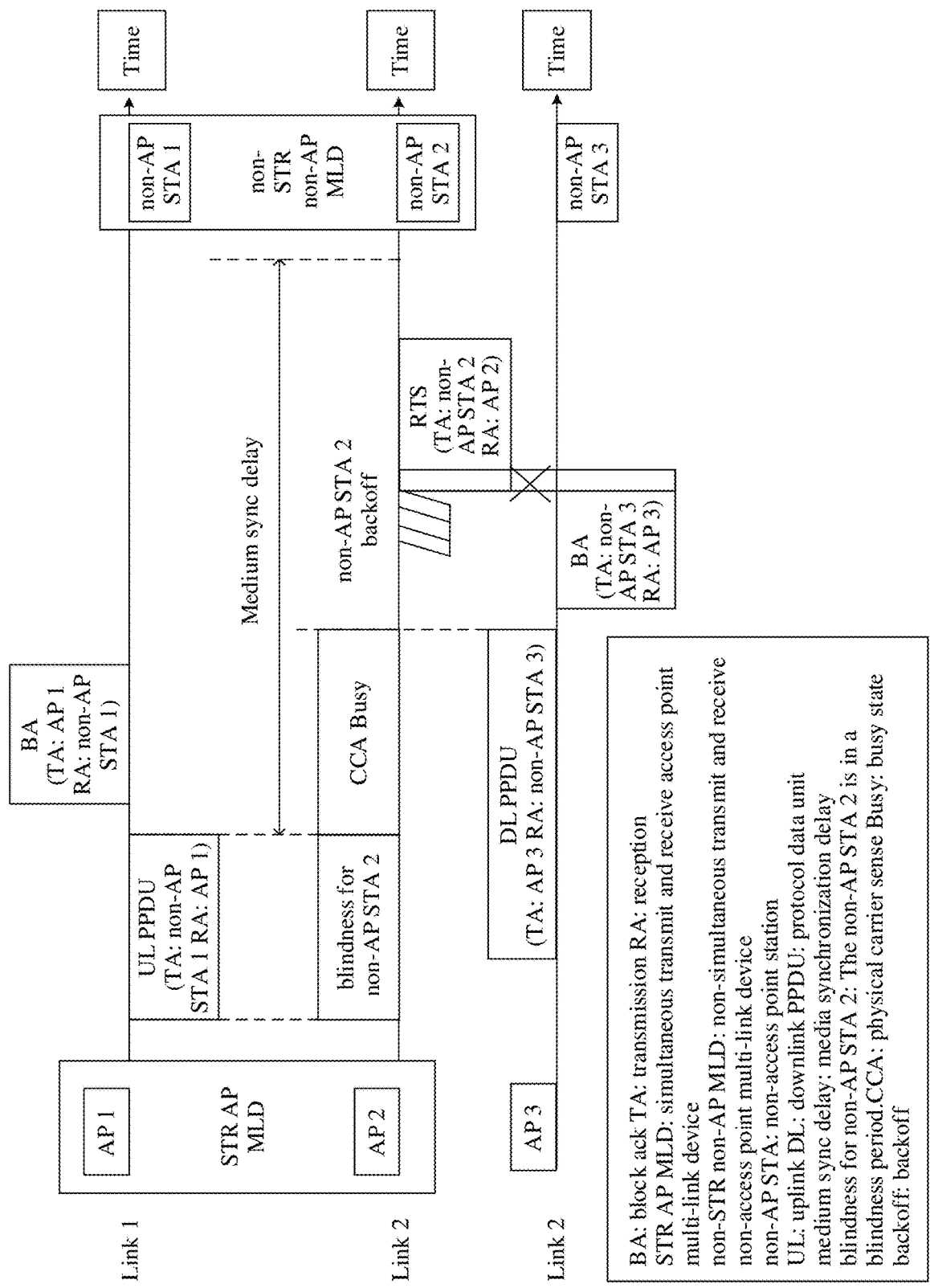
FIG. 7 is a schematic diagram of another contention channel according to an embodiment of this application.

FIG. 7 is a schematic diagram of another contention channel according to an embodiment of this application. As shown in FIG. 7, an STR AP MLD includes an AP 1 and an AP 2. The STR AP MLD does not include an AP 3. The AP 3 may be a single device, or may be affiliated with another AP MLD. The AP 1 operates on a link 1, and the AP 2 and the AP 3 operate on a link 2. A non-STR non-AP MLD includes a non-AP STA 1 and a non-AP STA 2. The non-STR non-AP MLD does not include a non-AP STA 3. The non-AP STA 3 may be a single device, or may be affiliated with another non-AP MLD. The non-AP STA 1 operates on the link 1, and the non-AP STA 2 and the non-AP STA 3 operate on the link 2.

When the non-AP STA 1 sends an uplink PPDU to the AP 1 on the link 1, because a frequency spacing between frequency bands of the link 1 and the link 2 is small, the link 2 is in a blindness period (refer to blindness for non-AP STA 2 shown in FIG. 7). After data transmission on the link 1 is completed, the non-AP STA 2 starts a medium sync delay timer. In other words, an end moment of the uplink PPDU on the link 1 is aligned with/the same as a start moment of medium sync delay. Within the medium sync delay, the non-AP STA 2 performs CCA detection on the link 2 based on a TBD energy detection (ED) threshold, for example, from −82 dbm to −62 dbm. In this case, if a downlink PPDU is being transmitted on the link 2, namely, if a start moment of the downlink PPDU on the link 2 is earlier than a moment at which CCA detection is performed on the link 2, and an end moment of the downlink PPDU on the link 2 is aligned with/the same as a moment at which CCA detection succeeds, the non-AP STA 2 determines that the link 2 is in a busy state. As shown in FIG. 7, that the non-AP STA 2 determines that the link 2 is in a busy state means that the non-AP STA 2 considers that the link 2 is in "CCA busy" before the end moment of the downlink PPDU (TA indicates the AP 3, and RA indicates the non-AP STA 3). The end moment of the downlink PPDU is also a start moment of "CCA detection succeeds", and "CCA detection succeeds" means that the non-AP STA 2 determines or detects that the link 2 is no longer in the busy state. In this case, the non-AP STA 2 starts backoff. In other words, after transmission of the downlink PPDU on the link 2 is completed, the non-AP STA 2 starts EDCA on the link 2. As shown in FIG. 7, a start moment of non-AP STA 2 backoff on the link 2 is a moment at which transmission of the downlink PPDU is completed, and is different from a start moment of non-AP STA 2 backoff in FIG. 9. It should be noted that a stricter ED threshold may also be used. As a result, the non-AP STA 2 determines that the link 2 is in a busy state. A person skilled in the art knows that CCA busy means that a detected signal exceeds the ED threshold, and CCA idle means that a detected signal does not exceed the ED threshold. The non-AP STA 2 may miss a packet header. As a result, an NAV cannot be updated. Therefore, the non-AP STA 2 cannot start EDCA on the link 2 after the updated NAV ends. As shown in FIG. 7, the start moment of the downlink PPDU (TA indicates the AP 3, and RA indicates the non-AP STA 3) on the link 2 is in the blindness for non-AP STA 2 shown in FIG. 7. In this case, the non-AP STA 2 cannot detect or receive the DL PPDU.

Further, the non-AP STA 2 may send a request to send frame to the AP 2 on the link 2. For the request to send frame, refer to an RTS (TA indicates the non-AP STA 2, and RA indicates the AP 2) in FIG. 7. However, a transmission opportunity (transmission opportunity, TXOP) corresponding to the downlink PPDU on the link 2 may not end. In other words, a block ack corresponding to the downlink PPDU is being transmitted on the link 2 (the block ack may not be sensed by the non-STR non-AP MLD, and as a result, the NAV cannot be updated). For the block ack, refer to a BA (TA indicates the non-AP STA 3, and RA indicates the AP 3) in FIG. 7. As shown in FIG. 7, it may be learned that a start moment of the block ack corresponding to the downlink PPDU on the link 2 is aligned with/the same as a start moment of the request to send frame sent to the AP 2 on the link 2. In other words, the block ack corresponding to the downlink PPDU on the link 2 collides with the request to send frame sent to the AP 2 on the link 2. As shown in FIG. 7, the foregoing "collision" specifically means that the block ack corresponding to the downlink PPDU on the link 2 and duration of the request to send frame sent to the AP 2 on the link 2 at least overlap.

A person skilled in the art may understand that the non-AP STA 2 "misses a packet header" means that the non-AP STA 2 does not detect or receive the packet header of the PPDU. A person skilled in the art knows that the packet header of the PPDU is a preamble, and includes at least fields such as L-LTF, L-STF, and L-SIG. That the header of the PPDU is not detected is equivalent to that the non-AP STA 2 considers that there is no start of a PPDU (no start of a PPDU).

Therefore, to avoid inter-frame collision and interference during channel contention, this application proposes a channel contention method, to support a non-simultaneous transmit and receive multi-link device to reduce inter-frame collision and interference during channel contention. This improves communication efficiency.

The following describes in detail the channel contention method provided in this embodiment of this application with reference to FIG. 8 to FIG. 13. In this embodiment of this application, a first multi-link device is used to describe the method.

In some feasible implementations, one or more of the first multi-link device and a second multi-link device in this embodiment of this application do not support simultaneous transmit and receive (STR) on a plurality of links. It may be understood that "supporting STR" described in this application may mean that a multi-link device has an STR capability and uses the STR capability in this communication; and "not supporting STR" may mean that a multi-link device does not have an STR capability, or may mean that the multi-link device has an STR capability but does not use the STR capability in this communication. It may be further understood that in some cases, the multi-link device may implement switching between STR and non-STR, namely, switching from supporting STR to not supporting STR, or switching from not supporting STR to supporting STR. The following describes the channel contention method provided in this embodiment of this application by using an example in which the first multi-link device does not support STR and the second multi-link device supports STR.

Optionally, the first multi-link device mentioned in this embodiment of this application may be the non-AP multi-link device 200 in FIG. 3, and the second multi-link device may be the AP multi-link device 100 in FIG. 3. It may be understood that, for ease of description, the following describes an example in which the non-AP multi-link device 200 includes two non-AP STAs. A first non-access point station mentioned in this embodiment of this application may be any STA in the non-AP multi-link device 200, and a second non-access point station is another STA in the non-AP multi-link device 200. A first access point mentioned in this embodiment of this application is any AP in the AP multi-link device 100. In this embodiment of this application, two links are used as an example for description. During actual application, there may be a plurality of (more than two) links. For an implementation of the plurality of links, refer to the implementation of the two links provided in this embodiment of this application. Details are not described herein again.

Figure 8:
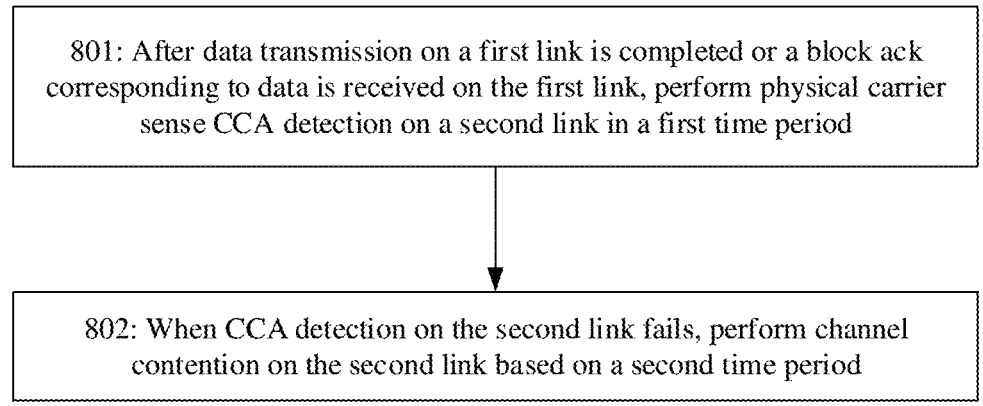
FIG. 8 is a schematic diagram of a channel contention method according to an embodiment of this application.

FIG. 8 is a schematic diagram of a channel contention method according to an embodiment of this application. As shown in FIG. 8, the channel contention method provided in this embodiment of this application includes but is not limited to the following steps.

801: After data transmission on a first link is completed or after a block ack corresponding to data is received on the first link, a first non-access point station of a first multi-link device performs clear channel assessment CCA detection on a second link in a first time period.

The data transmitted on the first link may be a radio frame, for example, a data frame or a management frame. This is not limited herein.

A start moment corresponding to the first time period is aligned with/the same as a moment at which the data transmission on the first link is completed.

In addition, after the data transmission on the first link is completed, the first non-access point station performs CCA detection on the second link in the first time period. The start moment corresponding to the first time period is earlier than a moment at which the block ack corresponding to the data is received on the first link.

It may be understood that "alignment" in this embodiment of this application may mean time synchronization. For example, transmission start moments are aligned (namely, the same) and/or transmission end moments are aligned (namely, the same). In addition, "alignment", "synchronization", "simultaneous", and "same moment" in embodiments of this application do not mean absolutely the same in a strict sense. During actual implementation, due to factors such as different PPDU transmission parameters, different access time, and transceiver processing capabilities on the two links, "alignment", "synchronization", or "simultaneous" herein allows a small offset that, for example, does not exceed short inter-frame space SIFS time.

Figure 9:
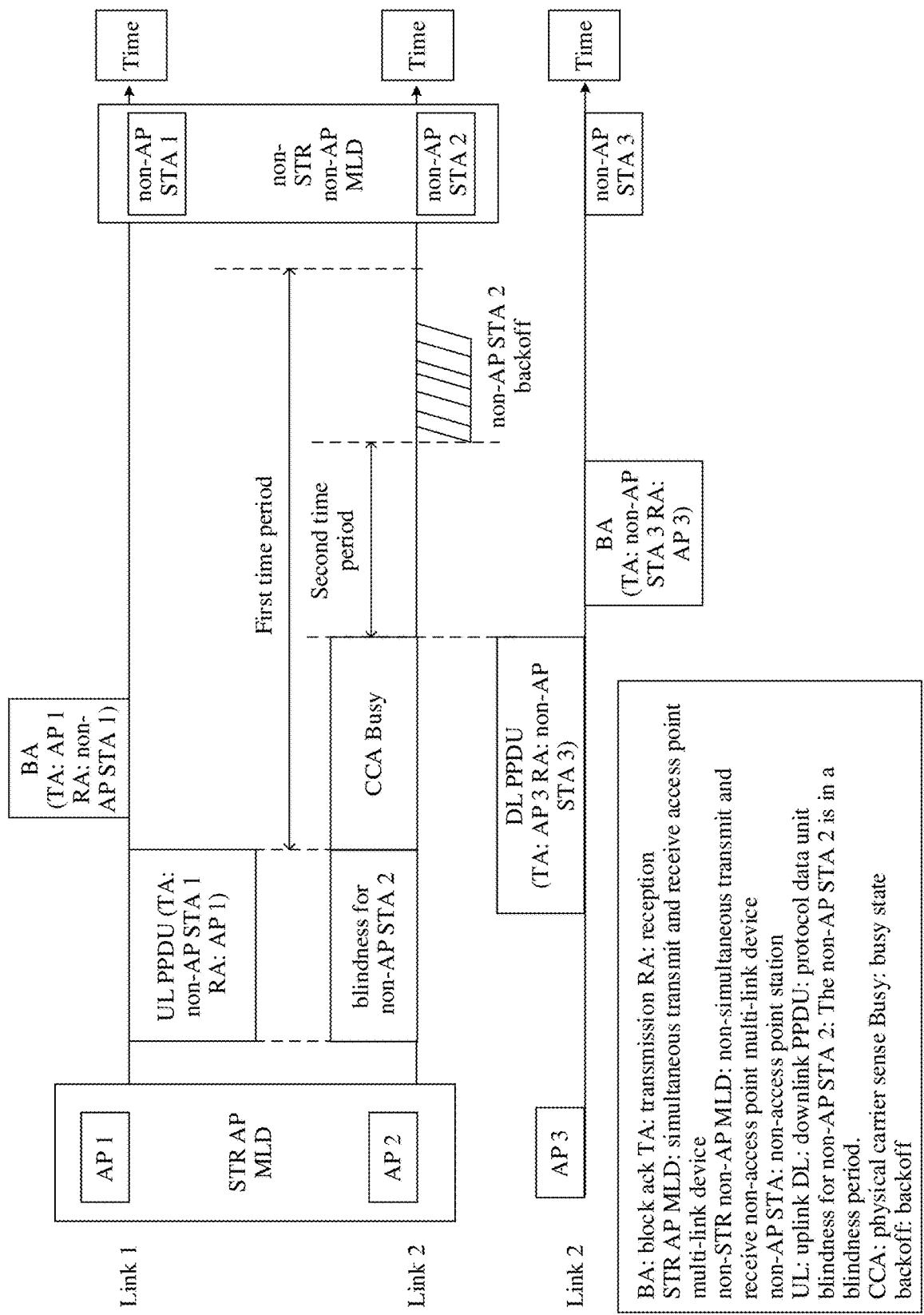
FIG. 9 is a schematic diagram of a time sequence of a channel contention method according to an embodiment of this application.

It should be noted that the first time period is a time period corresponding to a countdown timer. When the data transmission on the first link is completed, the first non-access point station starts the countdown timer. For example, as shown in FIG. 9, a "first time period" starts when transmission of an UL PPDU on a link 1 ends.

Optionally, the start moment corresponding to the first time period may be a start moment corresponding to a medium sync delay timer (MediumSyncDelay timer, refer to related descriptions of the medium sync delay timer in 802.11-20/1009r1), and an end moment corresponding to the first time period may be an end moment corresponding to the medium sync delay timer. In other words, it may be understood that based on a moment at which the data transmission on the first link is completed, the first non-access point station starts the medium sync delay timer.

In addition, the start moment corresponding to the first time period may alternatively be set by a second multi-link device or a first access point of the second multi-link device. For example, for the first link and the second link, the second multi-link device may set a same start moment or different start moments corresponding to the first time period. Further, the first access point operates on the second link.

802: When the CCA detection on the second link fails, the first non-access point station performs channel contention on the second link based on a second time period.

A start moment of the second time period is aligned with/the same as an end moment of the CCA. A start moment of CCA detection is aligned with/the same as the moment at which the data transmission on the first link is completed, or a start moment of CCA detection is aligned with/the same as a moment at which the block ack corresponding to the data is received on the first link. It should be noted that, at a moment before the start moment of the second time period, when the first non-access point station performs CCA detection on the second link, CCA detection fails; or at a moment after the start moment of the second time period, when the first non-access point station performs CCA detection on the second link, CCA detection succeeds. The first non-access point station is, for example, a non-AP STA 2 in FIG. 9. That CCA detection fails indicates a CCA busy state on a link 2 in FIG. 9, and the CCA busy state lasts until a "second time period" in FIG. 9. That CCA detection succeeds indicates a state after CCA busy on the link 2 in FIG. 9 ends. In this case, the state may be understood as non-CCA busy, namely, CCA idle. The "second time period" starts from switching from CCA busy to CCA idle.

It may be understood that the second time period may be extended inter-frame space EIFS time. The EIFS time may be aSIFSTime+AckTxTime+aSIFSTime. Herein, aSIFSTime indicates the short inter-frame space SIFS time, and AckTxTime indicates time of transmitting an ack frame.

Further, a minimum value of the second time period may be aSIFSTime+AckTxTime+aSIFSTime.

It may be understood that when CCA detection on the second link succeeds, channel contention may be performed on the second link according to 802.11-20/1009r1. The solution "according to 802.11-20/1009r1" herein refers to the foregoing solution described in FIG. 7. The solution in FIG. 7 is different from the solution in FIG. 9. In the solution described in FIG. 9, channel contention, namely, non-AP STA 2 backoff shown in FIG. 9, may be performed only after the "second time period". It is clear that possible collisions can be reduced according to the solution in FIG. 9.

It should be noted that, in this application, the performing channel contention on the second link may include: The first non-access point station performs channel contention on the second link according to a carrier sense multiple access with collision avoidance (CSMA/CA) mechanism or an enhanced distributed channel access (EDCA) mechanism. This is not limited herein.

To ensure that an access point and a non-access point station can access a wireless medium without colliding with each other, the CSMA/CA mechanism is used in 802.11. The mechanism is also referred to as a distributed coordination function (DCF). The CSMA/CA mechanism is specifically as follows: Before sending data, the non-access point station needs to perform clear channel assessment (CCA) on the wireless medium. If the wireless medium is idle in a period of time (for example, distributed inter-frame space (DIFS)), the non-access point station may start a random backoff procedure. If the wireless medium is busy in the period of time, the non-access point station needs to wait until the wireless medium changes to idle and remains idle in a period of time (for example, DIFS), and then starts the random backoff procedure. After the random backoff procedure ends, the non-access point station may perform frame exchange. Backoff time in the random backoff procedure is equal to a product of a random backoff value and slot time. The random backoff value is a value randomly selected from an evenly-distributed contention window [0, CW]. It may be understood that the backoff time in the random backoff procedure is equal to an initial value of a backoff timer in channel contention.

Optionally, there are a plurality of values in a contention window (CW) in the CSMA/CA mechanism. When the non-access point station initially attempts to contend for a channel, a value of the CW is a minimum value, namely, CWmin. When each transmission fails (for example, a collision occurs), retransmission needs to be performed, and channel contention is performed again. The value of the CW gradually increases until reaching a maximum value, namely, CWmax, of the CW. When data is successfully transmitted or transmission succeeds, the value of the CW is reset to CWmin.

The EDCA mechanism is an enhancement of the DCF, and allows services of different access classes to have different EDCA parameter sets. The EDCA parameter set includes parameters such as CWmin, CWmax, and arbitration inter-frame space (AIFS). EDCA parameters of different access classes are described in Table 2. AC_VO indicates that an access class is a voice stream, AC_VI indicates that an access class is a video stream, AC_BE indicates that an access class is a best effort stream, and AC_BK indicates that an access class is a background stream.

TABLE 2

EDCA parameters of different access classes

| AC (access class) | CWmin | CWmax | AIFSN (arbitration inter-frame space number) |
|---|---|---|---|
| AC_BK | 31 | 1023 | 7 |
| AC_BE | 31 | 1023 | 3 |
| AC_VI | 15 | 31 | 2 |
| AC_VO | 7 | 15 | 2 |
| Legacy | 15 | 1023 | 2 |

For a service of a specific access class, the random backoff procedure is basically the same as that of the DCF. The difference is that the AIFS replaces the DIFS in the DCF. In other words, when the channel returns to idle, the random backoff procedure may be performed only after the channel remains idle in the AIFS. The AIFS may be equal to a sum of a short inter-frame space (SIFS) and a product of an arbitration inter-frame space number (AIFS number, AIFSN) and a slot time, namely, AIFS[AC]=a SIFS time+ AIFSN[AC]*(a Slot Time). It may be understood that units of both the AIFS and the SIFS are time units.

Optionally, the performing clear channel assessment CCA detection on a second link in a first time period includes: The first non-access point station adjusts a CCA threshold to obtain an adjusted CCA threshold, where the adjusted CCA threshold is less than the unadjusted CCA threshold; and the first non-access point station performs CCA detection on the second link in the first time period based on the adjusted CCA threshold.

The CCA threshold includes an energy detection threshold or a midamble-energy detection threshold.

It should be noted that, in this implementation, the unadjusted energy detection threshold may range from −82 dbm to −62 dbm. The unadjusted midamble-energy detection threshold may be −72 dbm. Further, the adjusted midamble-energy detection threshold may be a value less than −72 dbm. For example, the adjusted midamble-energy detection threshold may be −82 dbm.

It may be understood that, in an implementation, a manner of performing CCA detection on a link based on the adjusted CCA threshold may be referred to as enhanced CCA. A specific name is not limited herein. Further, in this application, CCA includes CCA other than the enhanced CCA or enhanced CCA. For example, CCA other than the enhanced CCA is a manner of performing CCA detection on a link based on the unadjusted energy detection threshold or the unadjusted midamble-energy detection threshold. It may be understood that, that the first non-access point station may perform CCA detection on the second link in the first time period includes: The first non-access point station performs the enhanced CCA detection or CCA detection other than the enhanced CCA detection on the second link in the first time period. When the enhanced CCA detection on the second link or CCA detection other than the enhanced CCA detection fails, the first non-access point station may perform channel contention on the second link based on the second time period.

A person skilled in the art learns that, the foregoing description that "CCA detection fails" includes: Strength of a detected signal is greater than the foregoing CCA threshold. In this case, the state is recorded as CCA busy. The foregoing CCA threshold is, for example, an energy detection (CCA-ED) threshold or a midamble-energy detection (midamble-ED) threshold. Correspondingly, that "CCA detection succeeds" means that strength of a detected signal is not greater than the foregoing CCA threshold. In this case, the state is recorded as CCA idle. For details, refer to related regulations of the IEEE Std 802.11-2016, 19.3.19.5.1 CCA-Energy Detect (CCA-ED).

CCA-ED shall detect a channel busy condition when the received signal strength exceeds the CCA-ED threshold as given by dot11OFDMEDTThreshold for the primary 20 MHz channel and dot11OFDMEDTThreshold for the secondary 20 MHz channel (if present). The CCA-ED thresholds for the operating classes requiring CCA-ED are subject to the criteria in D.2.5. (CCA-ED shall detect a channel busy condition when the received signal strength exceeds the CCA-ED threshold as given by dot11OFDMEDThreshold for the primary 20 MHz channel and dot11OFDMEDThreshold for the secondary 20 MHz channel (if present). The CCA-ED thresholds for the operating classes requiring CCA-ED are subject to the criteria in D.2.5.)

Optionally, the performing channel contention on the second link based on the second time period includes: If an end moment corresponding to the second time period is earlier than an end moment corresponding to the first time period, the first non-access point station performs channel contention on the second link after the end moment corresponding to the second time period. In the solution described in FIG. 9, the foregoing description that "when the CCA detection on the second link fails, the first non-access point station performs channel contention on the second link based on a second time period" means: After the first non-access point station (the non-AP STA 2 in FIG. 9) detects that CCA busy is switched to non-CCA busy (CCA idle), the first non-access point station starts to perform backoff (non-AP STA 2 backoff in FIG. 9) after the second time period (content in FIG. 9 conforms to the foregoing description that "an end moment corresponding to the second time period is earlier than an end moment corresponding to the first time period"). This is different from the solution in FIG. 7. In the solution in FIG. 7, after detecting that CCA busy is switched to non-CCA busy (CCA idle), the first non-access point station (the non-AP STA 2 in FIG. 7) may immediately start backoff. If an end moment corresponding to the second time period is later than an end moment corresponding to the first time period, the first non-access point station performs channel contention on the second link after the end moment corresponding to the first time period or after the end moment corresponding to the second time period. In the solution described in FIG. 10, the foregoing description that "when the CCA detection on the second link fails, the first non-access point station performs channel contention on the second link based on a second time period" means: After the first non-access point station (a non-AP STA 2 in FIG. 10) detects that CCA busy is switched to non-CCA busy (CCA idle), the first non-access point station (the non-AP STA 2 in FIG. 10) may start backoff (non-AP STA 2 backoff in FIG. 10) only at one of the two moments: the end moment of the first time period and the end moment of the second time period. This is different from the solution in FIG. 7. In the solution in FIG. 7, after detecting that CCA busy is switched to non-CCA busy (CCA idle), the first non-access point station (the non-AP STA 2 in FIG. 7) may immediately start backoff.

It should be noted that, if the end moment corresponding to the second time period is earlier than the end moment corresponding to the first time period, the first non-access point station may start backoff at the end moment corresponding to the second time period. If the end moment corresponding to the second time period is later than the end moment corresponding to the first time period, the first non-access point station may start backoff at the end moment corresponding to the first time period or start backoff at the end moment corresponding to the second time period.

It may be understood that FIG. 8 is merely a procedure of the channel contention method provided in this embodiment of this application, and the channel contention method in this application may alternatively be implemented in another procedure. The following briefly describes a time sequence procedure of the channel contention method in this application with reference to several specific examples. The following specific examples are merely examples for ease of understanding. During actual application, the time sequence procedure of the channel contention method in this application may be longer than or shorter than a procedure in the following specific examples.

For ease of description, in the following specific examples, it is assumed that a first multi-link device (for example, a non-AP MLD) includes a non-AP STA 1 and a non-AP STA 2. The first multi-link device does not include a non-AP STA 3. The non-AP STA 3 may be a single device, or may be affiliated with another non-AP MLD. The non-AP STA 1 operates on a link 1 (link 1), and the non-AP STA 2 and the non-AP STA 3 operate on a link 2 (link 2). A second multi-link device (for example, an AP MLD) includes an AP 1 and an AP 2. The second multi-link device does not include an AP 3. The AP 3 may be a single device, or may be affiliated with another AP MLD. The AP 1 operates on the link 1, and the AP 2 and the AP 3 operate on the link 2. The first multi-link device does not support STR, and the second multi-link device supports STR.

In an example, FIG. 9 is a schematic diagram of a time sequence of a channel contention method according to an embodiment of this application. As shown in FIG. 9, the non-AP STA 1 sends an uplink PPDU to the AP 1 on the link 1. Because a frequency spacing between frequency bands of the link 1 and the link 2 is small, when data is transmitted on the link 1, channel interference may affect CCA on the link 2. As a result, channel information of the link 2 cannot be monitored. In other words, the link 2 is in a blindness period. The blindness period is the blindness for non-AP STA 2 shown in FIG. 9. In the embodiment described in FIG. 9, when the non-AP STA 2 is in the blindness period on the link 2, the AP 3 sends a DL PPDU to the non-AP STA 3 on the link 2. In this case, the non-AP STA 2 cannot detect the start of the DL PPDU.

As shown in FIG. 9, it may be learned that a sending moment of the uplink PPDU on the link 1 is aligned with/the same as a start moment of the blindness period of the link 2, and an end moment of the uplink PPDU on the link 1 is aligned with/the same as an end moment of the blindness period of the link 2. Therefore, after transmission of the uplink PPDU on the link 1 is completed, the AP 1 may send a block ack to the non-AP STA 1 on the link 1. In addition, after transmission of the uplink PPDU on the link 1 is completed, the link 2 is not in a blindness period. In other words, channel information of the link 2 may be monitored. It may be understood that after transmission of the uplink PPDU on the link 1 is completed, the non-AP STA 2 may start countdown based on the start moment corresponding to the first time period. In other words, the non-AP STA 2 starts a countdown timer. A time period corresponding to the countdown timer is the first time period. In the first time period, the non-AP STA 2 may perform CCA detection on the link 2.

Further, when CCA detection is performed on the link 2, because the AP 3 is sending the downlink PPDU to the non-AP STA 3 on the link 2, CCA detection on the link 2 fails. That "CCA detection fails" indicates "CCA busy" shown in FIG. 9. It may be understood that after transmission of the downlink PPDU is completed, CCA detection on the link 2 succeeds. That "CCA detection succeeds" means that "CCA busy" ends and "CCA idle" starts in FIG. 9. As shown in FIG. 9, it may be learned that an end moment of transmission of the downlink PPDU is the same as/aligned with the moment at which CCA detection on the link 2 succeeds, and the start moment corresponding to the second time period is the same as/aligned with the moment at which CCA detection on the link 2 succeeds. Further, in the second time period, a block ack BA corresponding to the downlink PPDU is being transmitted on the link 2. If a moment at which transmission of the block ack corresponding to the downlink PPDU on the link 2 is completed is earlier than the end moment corresponding to the second time period, and the end moment corresponding to the second time period is earlier than the end moment corresponding to the first time period, the non-AP STA 2 starts backoff at the end moment corresponding to the second time period. In this case, inter-frame collision and interference are avoided.

Figure 10:
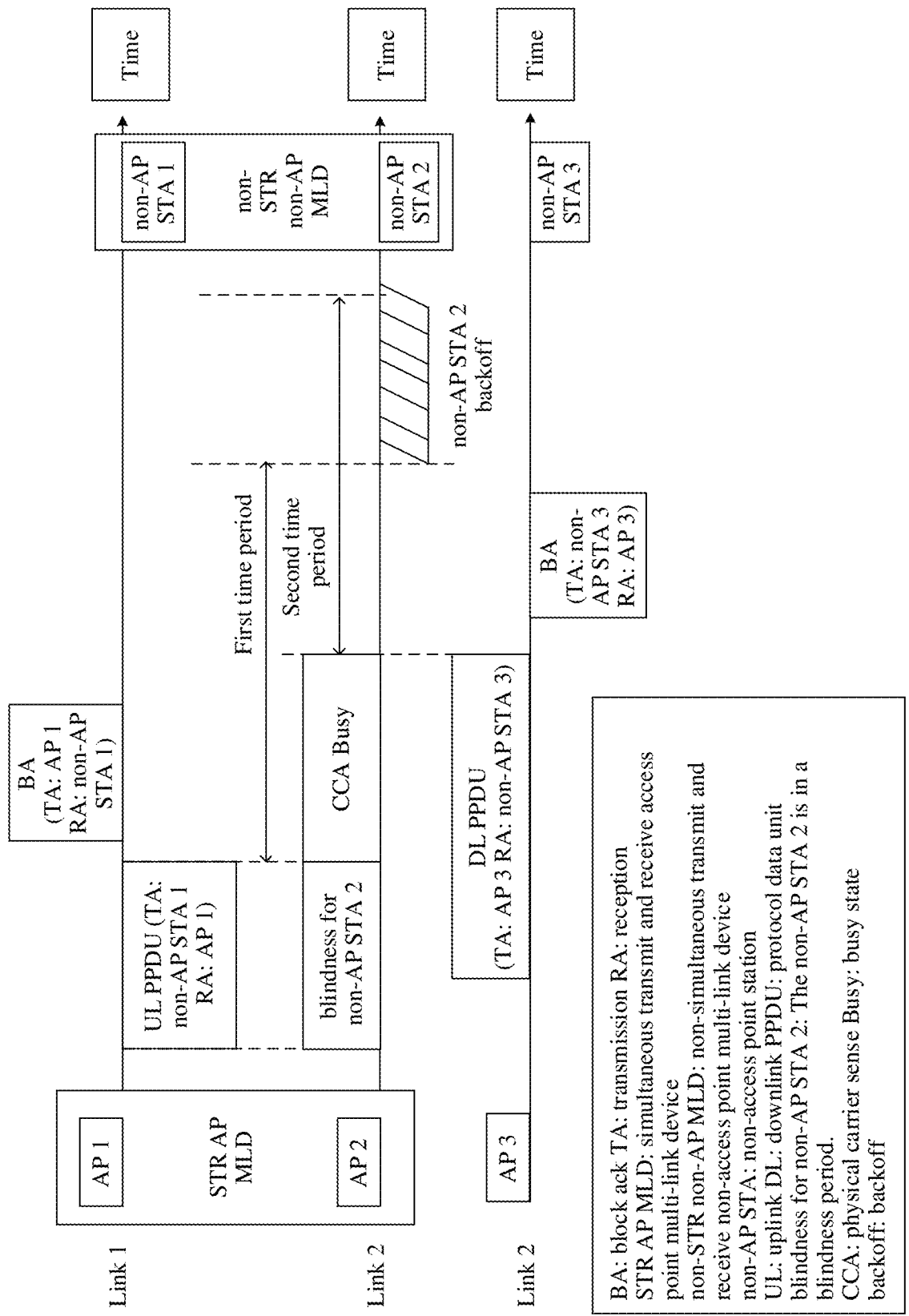
FIG. 10 is a schematic diagram of another time sequence of a channel contention method according to an embodiment of this application.

In another example, FIG. 10 is a schematic diagram of a time sequence of a channel contention method according to an embodiment of this application. As shown in FIG. 10, the non-AP STA 1 sends an uplink PPDU to the AP 1 on the link 1. Because a frequency spacing between frequency bands of the link 1 and the link 2 is small, when data is transmitted on the link 1, channel interference may affect CCA detection on the link 2. As a result, channel information of the link 2 cannot be monitored. In other words, the link 2 is in a blindness period. The blindness period is the blindness for non-AP STA 2 shown in FIG. 10. In the embodiment described in FIG. 10, when the non-AP STA 2 is in the blindness period on the link 2, the AP 3 sends a DL PPDU to the non-AP STA 3 on the link 2. In this case, the non-AP STA 2 cannot detect the start of the DL PPDU.

As shown in FIG. 10, it may be learned that a sending moment of the uplink PPDU on the link 1 is aligned with/the same as a start moment of the blindness period of the link 2, and an end moment of the uplink PPDU on the link 1 is aligned with/the same as an end moment of the blindness period of the link 2. Therefore, after transmission of the uplink PPDU on the link 1 is completed, the AP 1 may send a block ack to the non-AP STA 1 on the link 1. In addition, after transmission of the uplink PPDU on the link 1 is completed, the link 2 is not in a blindness period. In other words, channel information of the link 2 may be monitored. It may be understood that after transmission of the uplink PPDU on the link 1 is completed, the non-AP STA 2 may start countdown based on the start moment corresponding to the first time period. In other words, the non-AP STA 2 starts a countdown timer. A time period corresponding to the countdown timer is the first time period. In the first time period, the non-AP STA 2 may perform CCA detection on the link 2.

Further, when CCA detection is performed on the link 2, because the AP 3 is sending the downlink PPDU to the non-AP STA 3 on the link 2, CCA detection on the link 2 fails. That "CCA detection fails" indicates "CCA busy" shown in FIG. 10. It may be understood that after transmission of the downlink PPDU is completed, CCA detection on the link 2 succeeds. That "CCA detection succeeds" means that "CCA busy" ends and "CCA idle" starts in FIG. 10. As shown in FIG. 10, it may be learned that an end moment of transmission of the downlink PPDU is the same as/aligned with the moment at which CCA detection on the link 2 succeeds, and the start moment corresponding to the second time period is the same as/aligned with the moment at which CCA detection on the link 2 succeeds. Further, in the second time period, a block ack corresponding to the downlink PPDU is being transmitted on the link 2. If a moment at which transmission of the block ack corresponding to the downlink PPDU on the link 2 is completed is earlier than the end moment corresponding to the second time period, and the end moment corresponding to the second time period is later than the end moment corresponding to the first time period, the non-AP STA 2 starts backoff at the end moment corresponding to the second time period or at the end moment corresponding to the first time moment. In this case, inter-frame collision and interference are also avoided.

Figure 11:
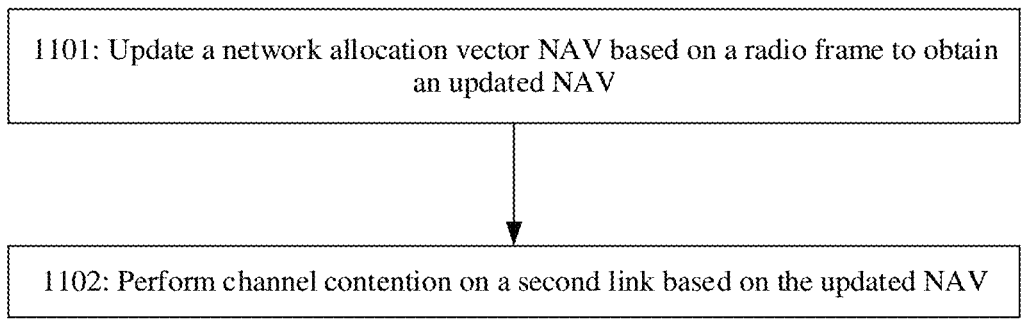
FIG. 11 is a schematic diagram of another channel contention method according to an embodiment of this application.

FIG. 11 is a schematic diagram of another channel contention method according to an embodiment of this application. As shown in FIG. 11, the another channel contention method provided in this embodiment of this application includes but is not limited to the following steps.

1101: A first non-access point station updates a network allocation vector NAV based on a radio frame to obtain an updated NAV.

The radio frame is a radio frame sent to a second non-access point station on a second link when the data is being transmitted on a first link or when a block ack corresponding to the data is being transmitted on the first link. The second non-access point station is a non-access point station other than the first non-access point station in a first multi-link device. It may be understood that the radio frame is a radio frame received when the second link is in a blindness period, and the first non-access point station may update the network allocation vector NAV based on the radio frame, to obtain the updated NAV.

For the data, refer to the descriptions of the data in step 801 in FIG. 8. Details are not described herein again.

The radio frame may include, for example, a block ack, a data frame, a management frame, and a trigger frame. This is not limited herein.

Further, the first non-access point station may update the network allocation vector NAV based on duration information carried in the radio frame, to obtain the updated NAV. Before updating, the duration information is greater than the NAV. In other words, the updated NAV is greater than the NAV. It may be understood that the radio frame may include a duration field. The duration field indicates the duration information. The first non-access point station may update the network allocation vector NAV based on the duration field included in the radio frame, to obtain the updated NAV. A specific update manner is not limited in this application.

For example, if a non-access point station other than the first non-access point station and the second non-access point station in the first multi-link device sends a PPDU on the second link, the first non-access point station may update the network allocation vector NAV based on a block ack carried in the PPDU, to obtain the updated NAV. The block ack carries duration information. In other words, the first non-access point station may update the network allocation vector NAV based on the duration information carried in the block ack, to obtain the updated NAV.

1102: The first non-access point station performs channel contention on the second link based on the updated NAV.

Optionally, the performing channel contention on the second link based on the updated NAV includes: If the updated NAV is less than a moment at which data transmission on the first link is completed or a moment at which the block ack is received on the first link, the first non-access point station performs CCA detection on the second link in a first time period; and when the CCA detection on the second link fails, the first non-access point station performs channel contention on the second link based on the second time period; or if the updated NAV is greater than a moment at which data transmission on the first link is completed or a moment at which the block ack is received on the first link, the first non-access point station performs channel contention on the second link when the updated NAV backs off to zero.

For the first time period, refer to the descriptions of the first time period in step 801 in FIG. 8. Details are not described herein again. For the second time period, refer to the descriptions of the second time period in step 802 in FIG. 8. Details are not described herein again. In addition, for that when CCA detection fails, the first non-access point station performs channel contention on the second link based on the second time period, refer to the related descriptions of step 802 in FIG. 8. Details are not described herein again.

It should be noted that if the updated NAV is greater than the moment at which data transmission on the first link is completed or the moment at which the block ack is received on the first link, the first non-access point station starts backoff based on the updated NAV. Regardless of whether data transmission on the first link is completed before the updated NAV backs off to 0, when the updated NAV backs off to 0, the first non-access point station may perform channel contention on the second link. Further, when the updated NAV backs off to 0, the first non-access point station performs CCA detection other than enhanced CCA on the second link. When CCA detection on the second link succeeds, the first non-access point station may perform frame exchange on the second link.

It may be understood that the moment at which the updated NAV backs off to 0 may be earlier than or later than or equal to the moment at which data transmission on the first link is completed. This is not limited herein. Further, when data transmission on the first link is completed, the first non-access point station starts a countdown timer. A time period corresponding to the countdown timer is the first time period.

Optionally, when data transmission on the first link is completed, regardless of whether the updated NAV backs off to 0, the first non-access point station may start the countdown timer. The time period corresponding to the countdown timer is the first time period.

In addition, if the moment at which the updated NAV backs off to 0 may be later than the moment at which data transmission on the first link is completed, the first non-access point station may perform channel contention in the first time period. Further, when the updated NAV backs off to 0, the first non-access point station may perform CCA detection other than enhanced CCA on the second link in the first time period. When CCA detection succeeds, the first non-access point station may perform frame exchange on the second link.

It may be understood that FIG. 11 is merely a procedure of the channel contention method provided in this embodiment of this application, and the channel contention method in this application may alternatively be implemented in another procedure. The following briefly describes a time sequence procedure of the channel contention method in this application with reference to several specific examples. The following specific examples are merely examples for ease of understanding. During actual application, the time sequence procedure of the channel contention method in this application may be longer than or shorter than a procedure in the following specific examples.

For ease of description, in the following specific examples, it is assumed that a first multi-link device (for example, a non-AP MLD) includes a non-AP STA 1 and a non-AP STA 2. The first multi-link device does not include a non-AP STA 3. The non-AP STA 3 may be a single device, or may be affiliated with another non-AP MLD. The non-AP STA 1 operates on a link 1 (link 1), and the non-AP STA 2 and the non-AP STA 3 operate on a link 2 (link 2). A second multi-link device (for example, an AP MLD) includes an AP 1 and an AP 2. The second multi-link device does not include an AP 3. The AP 3 may be a single device, or may be affiliated with another AP MLD. The AP 1 operates on the link 1, and the AP 2 and the AP 3 operate on the link 2. The first multi-link device does not support STR, and the second multi-link device supports STR.

Figure 12:
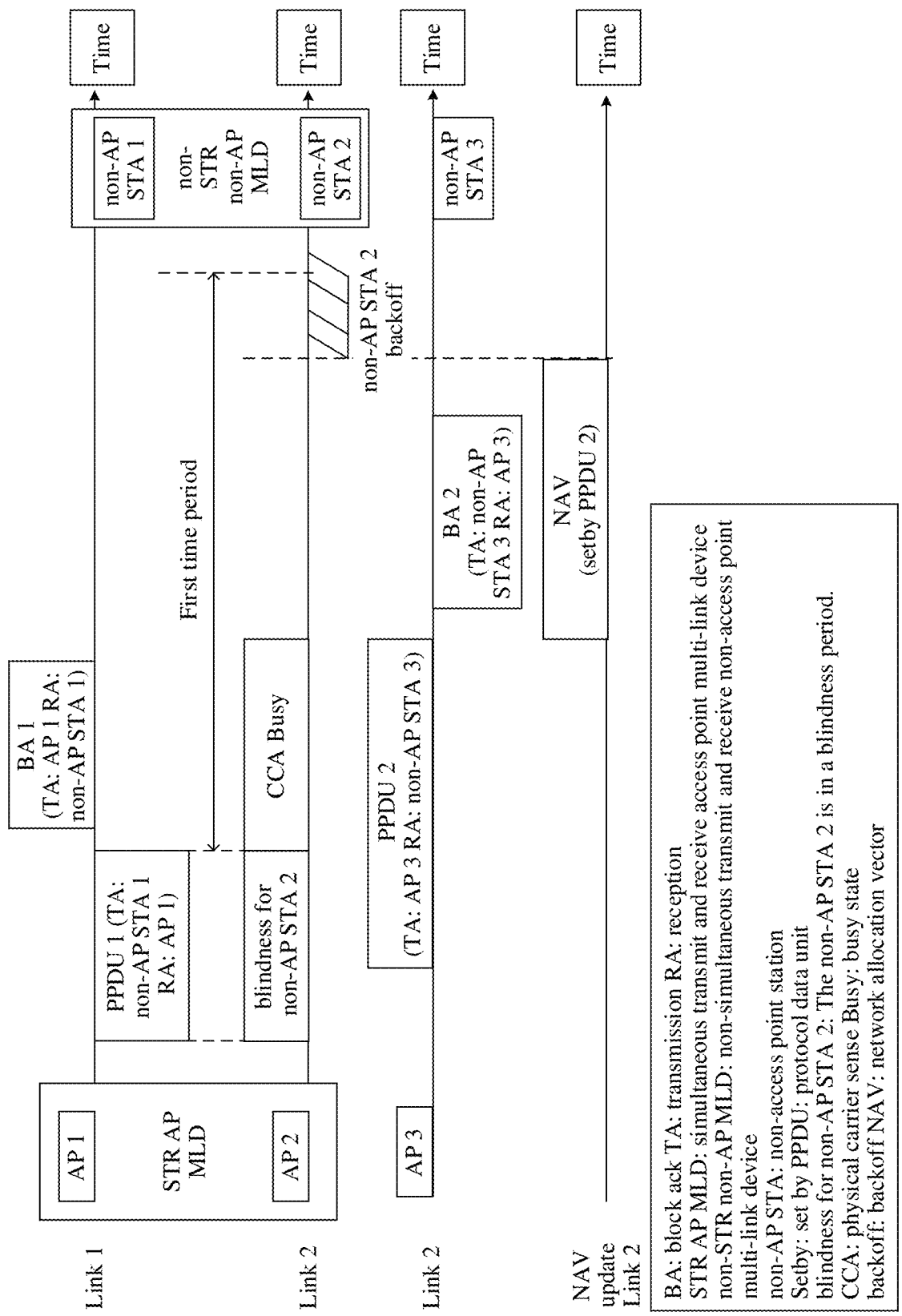
FIG. 12 is a schematic diagram of another time sequence of a channel contention method according to an embodiment of this application.

In an example, FIG. 12 is a schematic diagram of a time sequence of a channel contention method according to an embodiment of this application. As shown in FIG. 12, the non-AP STA 1 sends a PPDU 1 to the AP 1 on the link 1. Because a frequency spacing between frequency bands of the link 1 and the link 2 is small, when data is transmitted on the link 1, channel interference may affect CCA on the link 2. As a result, channel information of the link 2 cannot be monitored. In other words, the link 2 is in a blindness period. As shown in FIG. 12, it may be learned that a sending moment of the PPDU 1 on the link 1 is aligned with/the same as a start moment of the blindness period of the link 2, and an end moment of the PPDU 1 on the link 1 is aligned with/the same as an end moment of the blindness period of the link 2. Therefore, after transmission of the PPDU 1 on the link 1 is completed, the AP 1 may send a block ack 1 to the non-AP STA 1 on the link 1. In addition, after transmission of the PPDU 1 on the link 1 is completed, the link 2 is not in a blindness period. In other words, channel information of the link 2 may be monitored. It may be understood that after transmission of the PPDU 1 on the link 1 is completed, the non-AP STA 2 may start countdown based on the start moment corresponding to the first time period. In other words, the non-AP STA 2 starts a countdown timer. A time period corresponding to the countdown timer is the first time period.

Further, when the link 2 is in the blindness period, the AP 3 is sending a PPDU 2 to the non-AP STA 3 on the link 2. As shown in FIG. 12, it may be learned that a sending moment of the PPDU 2 on the link 2 is later than a start moment of the blindness period of the link 2, and a receiving moment of the PPDU 2 on the link 2 is earlier than an end moment of the blindness period of the link 2. In other words, the PPDU 2 is received by the non-AP STA 3 when the link 2 is in the blindness period. Further, when the non-AP STA 3 receives the PPDU 2, the non-AP STA 2 may update an NAV based on the PPDU 2. Optionally, the end moment of receiving the PPDU 2 on the link 2 may be earlier than or later than or equal to the end moment of the blindness period of the link 2. This is not limited herein.

It may be understood that after transmission of the PPDU 2 is completed, CCA detection on the link 2 succeeds. As shown in FIG. 12, it may be learned that an end moment of transmission of the PPDU 2 is the same as/aligned with a moment at which CCA detection on the link 2 succeeds. Further, after receiving the PPDU 2, the non-AP STA 3 may send a block ack 2 to the AP 3 on the second link. The non-AP STA 2 re-updates the NAV based on the block ack 2. Then, the non-AP STA 2 may perform backoff based on the re-updated NAV. When the re-updated NAV backs off to 0, the non-AP STA 2 performs CCA detection other than enhanced CCA on the second link. When CCA detection succeeds, the first non-access point station may perform frame exchange on the second link.

In addition, as shown in FIG. 12, it may be learned that when data transmission on the first link is completed, regardless of whether the re-updated NAV backs off to 0, the first non-access point station starts countdown based on the start moment corresponding to the first time period. In other words, when data transmission on the first link is completed, the first non-access point station starts a countdown timer. A time period corresponding to the countdown timer is the first time period.

It may be understood that an end moment of the NAV corresponding to the PPDU 2 is earlier than an end moment of the NAV corresponding to the block ack 2. Optionally, if another PPDU from the AP 3 is received after the block ack 2, the non-AP STA 2 may further re-update the NAV based on the another PPDU.

Figure 13:
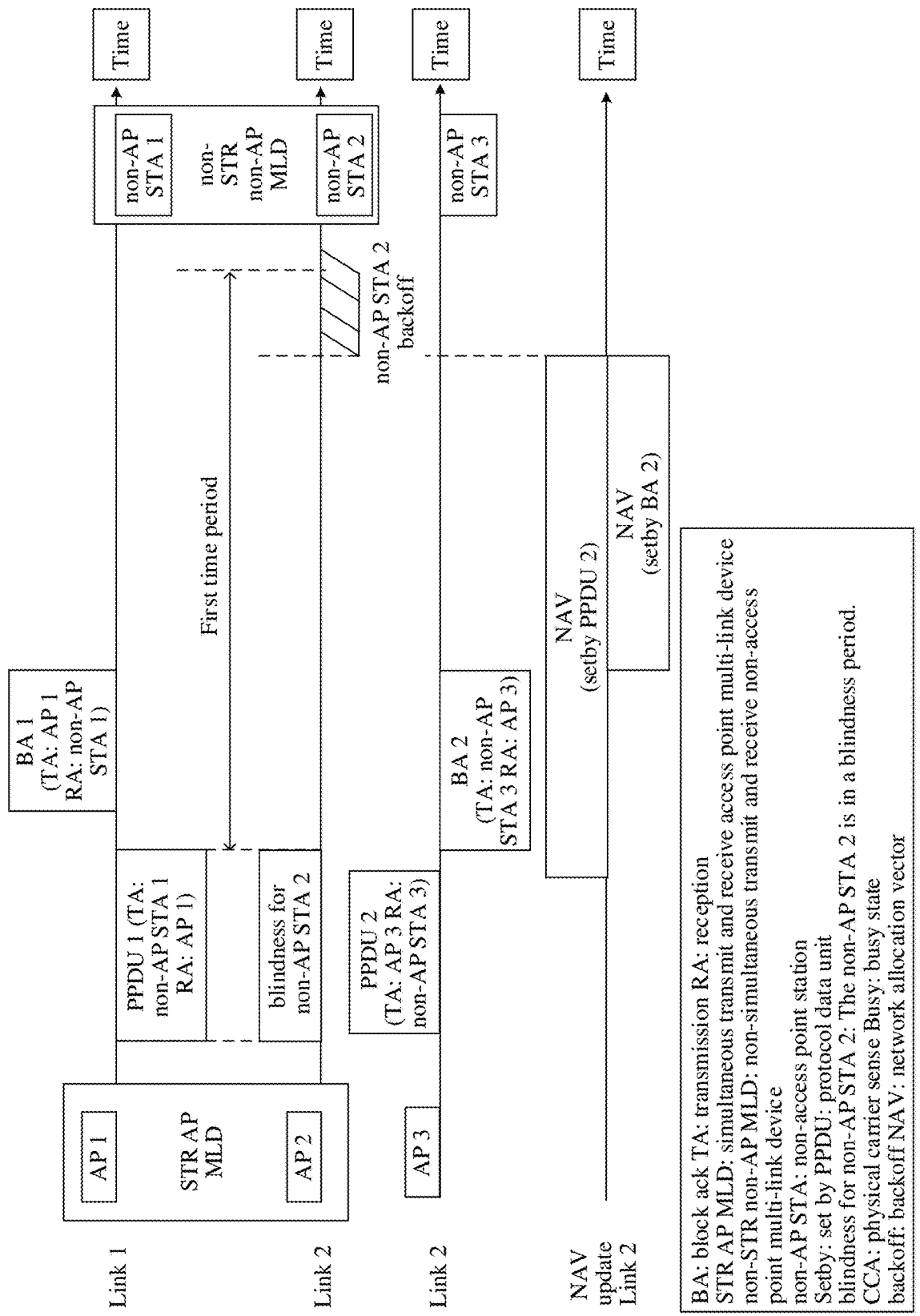
FIG. 13 is a schematic diagram of another time sequence of a channel contention method according to an embodiment of this application.

In an example, FIG. 13 is a schematic diagram of a time sequence of a channel contention method according to an embodiment of this application. As shown in FIG. 13, the non-AP STA 1 sends a PPDU 1 to the AP 1 on the link 1. Because a frequency spacing between frequency bands of the link 1 and the link 2 is small, when data is transmitted on the link 1, channel interference may affect CCA on the link 2. As a result, channel information of the link 2 cannot be monitored. In other words, the link 2 is in a blindness period. As shown in FIG. 13, it may be learned that a sending moment of the PPDU 1 on the link 1 is aligned with/the same as a start moment of the blindness period of the link 2, and an end moment of the PPDU 1 on the link 1 is aligned with/the same as an end moment of the blindness period of the link 2. Therefore, after transmission of the PPDU 1 on the link 1 is completed, the AP 1 may send a block ack 1 to the non-AP STA 1 on the link 1. In addition, after transmission of the PPDU 1 on the link 1 is completed, the link 2 is not in a blindness period. In other words, channel information of the link 2 may be monitored.

Further, the AP 3 is sending a PPDU 2 to the non-AP STA 3 on the link 2. It may be understood that a sending moment of the PPDU 2 is later than the start moment of the blindness period of the link 2, and a receiving moment of the PPDU 2 is earlier than the end moment of the blindness period of the link 2. In other words, the PPDU 2 is a PPDU received when the link 2 is in the blindness period. Further, when the non-AP STA 3 receives the PPDU 2, the non-AP STA 2 updates an NAV based on the PPDU 2. In addition, after receiving the PPDU 2, the non-AP STA 3 may send a block ack 2 to the AP 3 on the second link. The non-AP STA 2 may re-update the NAV based on the block ack 2. Then, the non-AP STA 2 may perform backoff based on the re-updated NAV. When the re-updated NAV backs off to 0, the non-AP STA 2 performs CCA detection other than enhanced CCA on the second link. When CCA detection succeeds, the first non-access point station may perform frame exchange on the second link. Optionally, the end moment of receiving the PPDU 2 on the link 2 may be earlier than or later than or equal to the end moment of the blindness period of the link 2. This is not limited herein.

In addition, as shown in FIG. 13, it may be learned that when data transmission on the first link is completed, regardless of whether the re-updated NAV backs off to 0, the first non-access point station starts countdown based on the start moment corresponding to the first time period. In other words, when data transmission on the first link is completed, the first non-access point station starts a countdown timer. A time period corresponding to the countdown timer is the first time period.

It may be understood that an end moment of the NAV corresponding to the PPDU 2 is the same as an end moment of the NAV corresponding to the block ack 2. Optionally, if another PPDU from the AP 3 is received after the block ack 2, the non-AP STA 2 may further re-update the NAV based on the another PPDU.

According to the criteria known in the technical field, CCA detection described in the foregoing implementations includes at least detection on a primary 20 MHz channel (Primary 20 MHz channel) occupied by a PPDU. For details, refer to sections such as IEEE Std 802.11-2016, 10.22.2.5: When a STA and the BSS, of which the STA is a member, both support multiple channel widths, an EDCA TXOP is obtained based solely on activity of the primary channel. "Idle medium" in this subclause means "idle primary channel". Likewise "busy medium" means "busy primary channel". Once an EDCA TXOP has been obtained according to this subclause, further constraints defined in 11.16.9 and 10.22.3 might limit the width of transmission during the TXOP or deny the channel access, based on the state of CCA on secondary channel, secondary 40 MHz channel, or secondary 80 MHz channel. (When a STA and the BSS, of which the STA is a member, both support multiple channel widths, an EDCA TXOP is obtained based solely on activity of the primary channel. "Idle medium" in this subclause means "idle primary channel". Likewise "busy medium" means "busy primary channel". Once an EDCA TXOP has been obtained according to this subclause, further constraints defined in 11.16.9 and 10.22.3 might limit the width of transmission during the TXOP or deny the channel access, based on the state of CCA on secondary channel, secondary 40 MHz channel, or secondary 80 MHz channel.)

The foregoing content describes in detail the methods provided in this application. To better implement the foregoing solutions in embodiments of this application, embodiments of this application further provide corresponding apparatuses or devices.

Figure 14:
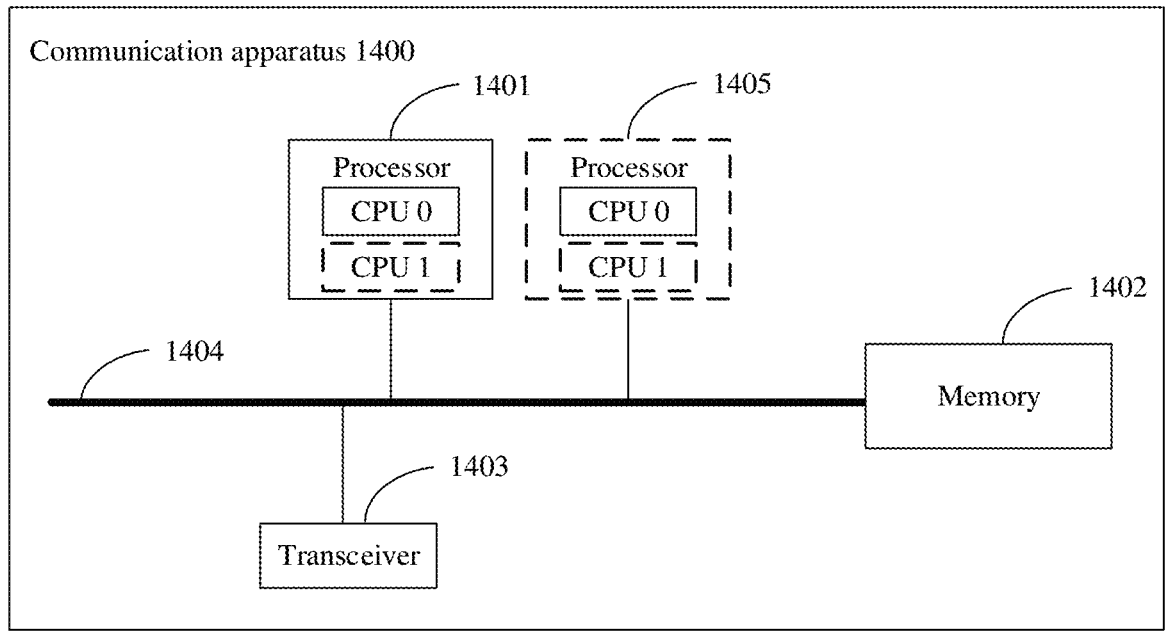
FIG. 14 is a schematic diagram of a structure of a communication apparatus according to an embodiment of this application.

FIG. 14 is a schematic diagram of a structure of a communication apparatus according to an embodiment of this application. As shown in FIG. 14, the communication apparatus 1400 may be the first multi-link device in the foregoing embodiments, or may be a chip or a processing system in the first multi-link device, and may implement the method and the function in any one of the foregoing embodiments. Due to an integration difference, the communication apparatus 1400 may include one or more of components shown in FIG. 14. The components shown in FIG. 14 may include at least one processor 1401, a memory 1402, a transceiver 1403, and a communication bus 1404. The processor, the transceiver, the memory, and the like are connected through the bus. A specific connection medium between the foregoing components is not limited in this embodiment of this application.

The following specifically describes the components of the communication apparatus 1400 with reference to FIG. 14.

The processor 1401 is a control center of the communication apparatus 1400, and may be one processor or may be a collective term of a plurality of processing elements. For example, the processor 1401 is a central processing unit (CPU), or an application-specific integrated circuit (ASIC), or is configured as one or more integrated circuits for implementing embodiments of this application, for example, one or more microprocessors (DSP) or one or more field programmable gate arrays (FPGA). The processor 1401 may implement various functions of a communication device by running or executing a software program stored in the memory 1402 and invoking data stored in the memory 1402. During specific implementation, in an embodiment, the processor 1401 may include one or more CPUs, for example, a CPU 0 and a CPU 1 shown in FIG. 14.

During specific implementation, in an embodiment, the communication apparatus 1400 may include a plurality of processors, for example, the processor 1401 and a processor 1405 shown in FIG. 14. Each of the processors may be a single-core processor (single-CPU) or may be a multi-core processor (multi-CPU). The processor herein may be one or more communication devices, circuits, and/or processing cores configured to process data (for example, computer program instructions).

The memory 1402 may be a read-only memory (ROM) or another type of static storage communication device that can store static information and instructions, a random access memory (RAM) or another type of dynamic storage communication device that can store information and instructions; or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), and a disk storage medium or another disk storage communication device, or any other medium that can be used to carry or store expected program code in a form of instructions or a data structure and that can be accessed by a computer, but is not limited thereto. The memory 1402 may exist independently, and is connected to the processor 1401 through the communication bus 1404. Alternatively, the memory 1402 may be integrated with the processor 1401. The memory 1402 is configured to store a software program for performing the solutions of this application, and the processor 1401 controls the execution.

The transceiver 1403 is configured to communicate with another device (for example, a second multi-link device). Certainly, the transceiver 1403 may be further configured to communicate with a communication network. The communication network is, for example, Ethernet, a radio access network (RAN), or a wireless local area network. The transceiver 1403 may include a receiving unit to implement a receiving function, and a transmitting unit to implement a transmitting function.

The communication bus 1404 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

In an example, the communication apparatus 1400 may be an entire device, and the communication apparatus may include a processor 1401, a memory 1402, a transceiver 1403, and a communication bus 1404. Optionally, another component, for example, a display screen, a user interface, or a signal detector may be further included. Optionally, the communication apparatus 1400 is a first multi-link device, and may be configured to implement the method and the function related to the first multi-link device in the foregoing embodiments. For example, the memory stores instructions, and when the processor invokes the instructions, the foregoing methods and functions are implemented. For example, the processor is configured to generate a signal or a frame, and the transceiver is configured to send the signal or the frame. For example, the processor is configured to perform step S141, S201, or the like, and the transceiver is configured to perform step S142, S202, S207, or the like.

In another example, the communication apparatus 1400 may be a chip system or a processing system in the first multi-link device, so that a device in which the chip system or the processing system is installed implements the method and the function in any one of the foregoing embodiments. In this case, the communication apparatus 1400 may include some components shown in FIG. 14. For example, the communication apparatus 1400 includes a processor. The processor may be coupled to a memory, invoke instructions in the memory, and execute the instructions, so that the device in which the chip system or the processing system is configured and installed implements the methods and the functions in the foregoing embodiments. Optionally, the memory may be a component in the chip system or the processing system, or may be a component coupled outside the chip system or the processing system. In an example, the chip system or the processing system is installed in the first multi-link device, so that the first multi-link device can implement the corresponding method and function in the foregoing embodiments.

The chip system or the processing system may support communication according to the 802.11 series protocols, for example, 802.11be, 802.11ax, and 802.11ac. The chip system may be installed in various devices supporting WLAN transmission scenarios. The devices in the WLAN transmission scenarios have been described in the specification of this application. Details are not described herein again.

In this embodiment of this application, the first multi-link device or the second multi-link device may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in this embodiment of this application, division into the modules is an example, and is merely logical function division. During actual implementation, another division manner may be used.

Figure 15:
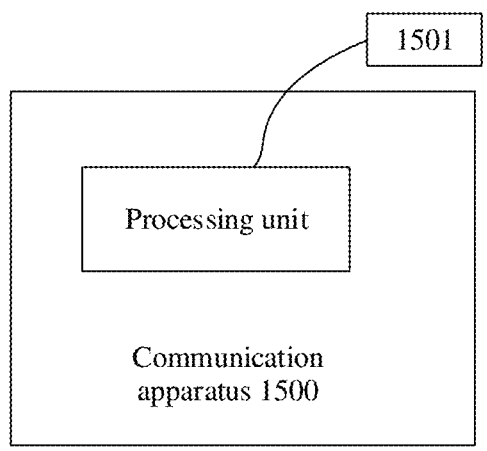
FIG. 15 is a schematic diagram of another structure of a communication apparatus according to an embodiment of this application.

When an integrated unit is used, FIG. 15 is a schematic diagram of another structure of a communication apparatus according to an embodiment of this application. As shown in FIG. 15, the communication apparatus 1500 may be a chip or a processing system in a multi-link device. The communication apparatus 1500 may perform operations of the first multi-link device in the foregoing method embodiments. The communication apparatus 1500 includes a processing unit 1501.

In an example, the communication apparatus 1500 is a non-access point station in the first multi-link device.

The processing unit 1501 may be configured to control and manage actions of the communication apparatus 1500. For example, CCA detection is performed on a second link in a first time period. Optionally, if the communication apparatus 1500 includes a storage unit, the processing unit 1501 may further execute a program or instructions stored in the storage unit, so that the communication apparatus 1500 implements the method and the function in any one of the foregoing embodiments.

For example, the processing unit 1501 may be configured to perform, for example, step 801 in FIG. 8, or step 801 in FIG. 8 and/or another process of the technology described in this specification. All related content of the steps in the foregoing method embodiments may be cited in function descriptions of the corresponding functional modules. Details are not described herein again.

For example, the communication apparatus 1500 may be the communication apparatus shown in FIG. 14. The processing unit 1501 may be the processor 1401 in FIG. 14. In addition, the communication apparatus 1500 may include a transceiver unit. The transceiver unit may be the transceiver 1403 in FIG. 14. Optionally, the communication apparatus 1500 may further include a memory. The memory is configured to store corresponding program code and data that are for the communication apparatus 1500 to perform any one of the foregoing channel contention methods between multi-link devices. Descriptions of all related content of the components in FIG. 14 may be cited in function descriptions of the corresponding components of the communication apparatus 1500. Details are not described herein again.

For example, the communication apparatus 1500 may alternatively be a chip or a processor. The processing unit 1501 is a processing circuit in the chip or the processor. The transceiver unit may be an input/output circuit in the chip or the processor. The input/output circuit is an interface for mutual communication or data exchange between the chip or the processor and another coupled component. It may be ensured that signal or data information or program instructions are input to the chip or the processor to be processed, processed data or a processed signal is output to another coupled component, and the first multi-link device in which the chip or the processor is installed is controlled to implement a function.

An embodiment of this application further provides a computer-readable storage medium. The computer-readable storage medium stores computer program code. When the foregoing processor executes the computer program code, an electronic device performs the method in any one of the foregoing embodiments in FIG. 8 and FIG. 11.

An embodiment of this application further provides a computer program product. When the computer program product runs on a computer, the computer is enabled to perform the method in any one of the foregoing embodiments in FIG. 8 and FIG. 11.

An embodiment of this application further provides a communication apparatus. The apparatus may exist in a product form of a chip. A structure of the apparatus includes a processor and an interface circuit. The processor is configured to communicate with another apparatus through the interface circuit, so that the apparatus performs the method in any one of the foregoing embodiments in FIG. 8 and FIG. 11.

An embodiment of this application further provides a communication system, including a first multi-link device and a second multi-link device. The first multi-link device and the second multi-link device may perform the method in any one of the foregoing embodiments in FIG. 8 and FIG. 11.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium, where the communication medium includes any medium that facilitates transmission of a computer program from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method, comprising:
   after data transmission on a first link is completed, or after a block acknowledgment corresponding to transmitted data is received on the first link, performing, by a first non-access point station of a first multi-link device, clear channel assessment (CCA) detection on a second link in a first time period, wherein a start moment corresponding to the first time period is the same as a moment at which the data transmission on the first link is completed, and the first link and the second link are links corresponding to the first multi-link device; and
   when the CCA detection on the second link fails, performing, by the first non-access point station, channel contention on the second link based on a second time period, wherein a start moment of the second time period is a moment at which failure of the CCA detection changes to success.

2. The method according to claim 1, wherein a CCA threshold of the CCA detection is −82 dbm, −72 dbm, or −62 dbm.

3. The method according to claim 1, wherein performing channel contention on the second link based on the second time period comprises:
   when an end moment corresponding to the second time period is earlier than an end moment corresponding to the first time period, performing, by the first non-access point station, channel contention on the second link after the end moment corresponding to the second time period.

4. The method according to claim 1, wherein performing channel contention on the second link based on the second time period comprises:
   when an end moment corresponding to the second time period is later than an end moment corresponding to the first time period, performing, by the first non-access point station, channel contention on the second link after the end moment corresponding to the first time period or after the end moment corresponding to the second time period.

5. The method according to claim 1, wherein performing channel contention on the second link based on the second time period comprises:
   when the CCA detection on the second link fails and no start of a physical layer protocol data unit (PPDU) is detected when the CCA detection on the second link fails, starting to perform channel contention on the second link after the second time period from the moment at which failure of CCA detection changes to success.

6. The method according to claim 5, wherein the second time period corresponds to an extended inter-frame space (EIFS) time period.

7. A communication apparatus, comprising:
a processor; and
a non-transitory memory, wherein the non-transitory memory is configured to store instructions, and when the processor runs the instructions, the communication apparatus is enabled to perform the following:
performing clear channel assessment (CCA) detection on a second link in a first time period, after data transmission on a first link is completed or after a block acknowledgment corresponding to transmitted data is received on the first link, wherein a start moment corresponding to the first time period is the same as a moment at which the data transmission on the first link is completed, and the first link and the second link are links corresponding to the communication apparatus; and
when the CCA detection on the second link fails, performing channel contention on the second link based on a second time period, wherein a start moment of the second time period is a moment at which failure of the CCA detection changes to success.

8. The apparatus according to claim 7, wherein a CCA threshold of the CCA detection is −82 dbm, −72 dbm, or −62 dbm.

9. The apparatus according to claim 7, wherein performing channel contention on the second link based on the second time period comprises:
when the CCA detection on the second link fails and no start of a physical layer protocol data unit (PPDU) is detected when the CCA detection on the second link fails, starting to perform channel contention on the second link after the second time period from the moment at which failure of CCA detection changes to success.

10. The apparatus according to claim 9, wherein the second time period is an extended inter-frame space (EIFS) time period.

11. The apparatus according to claim 7, wherein performing channel contention on the second link based on the second time period comprises:
when an end moment corresponding to the second time period is earlier than an end moment corresponding to the first time period, performing channel contention on the second link after the end moment corresponding to the second time period.

12. The apparatus according to claim 7, wherein performing channel contention on the second link based on the second time period comprises:
when an end moment corresponding to the second time period is later than an end moment corresponding to the first time period, performing channel contention on the second link after the end moment corresponding to the first time period or after the end moment corresponding to the second time period.

13. A wireless communication system, comprising:
a first multi-link device; and
a second multi-link device;
wherein the first multi-link device comprises a communication apparatus, and the communication apparatus is configured to perform the following steps:
performing clear channel assessment (CCA) detection on a second link in a first time period after data transmission on a first link is completed, wherein a start moment corresponding to the first time period is the same as a moment at which the data transmission on the first link is completed, and the first link and the second link are links corresponding to the first multi-link device and the second multi-link device; and
when the CCA detection on the second link fails, performing channel contention on the second link based on a second time period, wherein a start moment of the second time period is a moment at which failure of the CCA detection changes to success.

14. The system according to claim 13, wherein a CCA threshold of the CCA detection is −72 dbm.

15. The system according to claim 13, wherein performing channel contention on the second link based on the second time period comprises:
when the CCA detection on the second link fails and no start of a physical layer protocol data unit (PPDU) is detected, starting to perform channel contention on the second link after the second time period from the moment at which failure of CCA detection changes to success.

16. The system according to claim 15, wherein the second time period is an extended inter-frame space (EIFS) time period.

* * * * *